United States Patent
Manabe et al.

(10) Patent No.: US 6,894,746 B1
(45) Date of Patent: May 17, 2005

(54) APPARATUS AND METHOD FOR REFLECTING LIGHT INTO A SPECIFIED PLANE AREA

(75) Inventors: Katsuyuki Manabe, Kyoto (JP); Shigeru Aoyama, Kyoto (JP); Akihiro Funamoto, Kyoto (JP); Masayuki Shinohara, Kyoto (JP)

(73) Assignee: Omron Corporation (JP)

( * ) Notice: Subject to any disclaimer, the term of this patent is extended or adjusted under 35 U.S.C. 154(b) by 41 days.

(21) Appl. No.: 10/129,718

(22) PCT Filed: Nov. 9, 2000

(86) PCT No.: PCT/JP00/07914

§ 371 (c)(1),
(2), (4) Date: May 9, 2002

(87) PCT Pub. No.: WO01/35129

PCT Pub. Date: May 17, 2001

(30) Foreign Application Priority Data

Nov. 9, 1999 (JP) .......................... 11/318948

(51) Int. Cl.⁷ ............................ G02F 1/1335
(52) U.S. Cl. ................ 349/113; 359/459; 359/613
(58) Field of Search .............. 349/113; 359/459, 359/613

(56) References Cited

U.S. PATENT DOCUMENTS

| 5,128,787 A | * | 7/1992 | Blonder ..................... 349/113 |
| 5,581,379 A | * | 12/1996 | Aoyama et al. ............... 349/5 |
| 5,841,496 A | * | 11/1998 | Itoh et al. ................... 349/113 |
| 6,097,458 A | | 8/2000 | Tsuda et al. ................ 349/113 |
| 6,163,405 A | * | 12/2000 | Chang et al. ............... 359/599 |
| 6,219,119 B1 | * | 4/2001 | Nakai ........................ 349/113 |
| 6,452,653 B1 | * | 9/2002 | Yamanaka et al. .......... 349/113 |

FOREIGN PATENT DOCUMENTS

| CA | 1209566 A | 3/1999 |
| JP | 9-80426 | 3/1997 |
| JP | 10-177106 | 6/1998 |
| JP | 11-14983 | 1/1999 |
| JP | 11-190802 | 7/1999 |
| JP | 11-242105 | 7/1999 |
| KR | 97048744 A | 7/1997 |
| KR | 1999-014232 | 2/1999 |

OTHER PUBLICATIONS

Patent Abstracts of Japan, Publication No. 09–080426, published Mar. 28, 1997, 23 pages.
Patent Abstracts of Japan, Publication No. 11–014983, published Jan. 22, 1999, 28 pages.
Patent Abstracts of Japan, Publication No. 11–190802, published Jul. 13, 1999, 12 pages.
Patent Abstracts of Japan, Publication No. 11–242105, published Sep. 7, 1999, 16 pages.

* cited by examiner

Primary Examiner—Robert R. Kim
Assistant Examiner—Andrew Schechter
(74) Attorney, Agent, or Firm—Osha & May L.L.P.

(57) ABSTRACT

Unit reflection areas (13) each consisting of one or plural recesses and projections (17) are formed on the surface of a reflection plate (11). Light incident into the reflection plate (11) and reflected by respective unit reflection areas (13) is emitted to the entire specified plane area (emission area (14)) established on a specified plane, which is like a band: ring. The emission area (14) is established so that overlap thereof with a shining area of light regularly reflected by a liquid crystal panel (18) is made slight. With such a construction, in a reflection plate that is used for a reflection type or semi-transmission type display device, light that is reflected in useless directions, is reduced, and light utilization efficiency of incident light-can be increased.

20 Claims, 46 Drawing Sheets

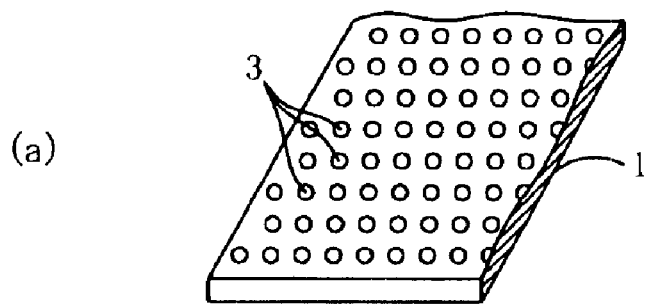
(a)
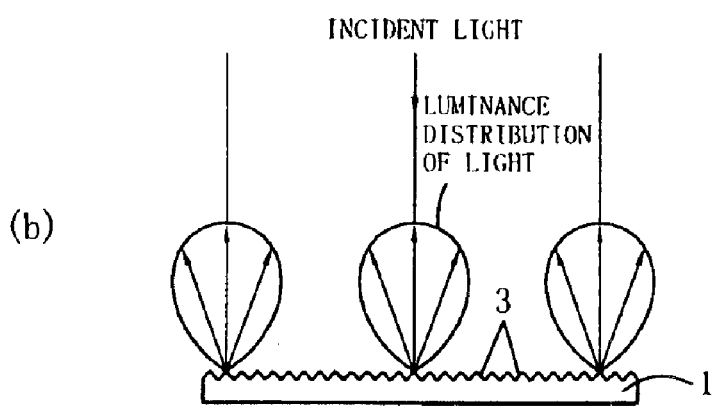
(b)
FIG. 2
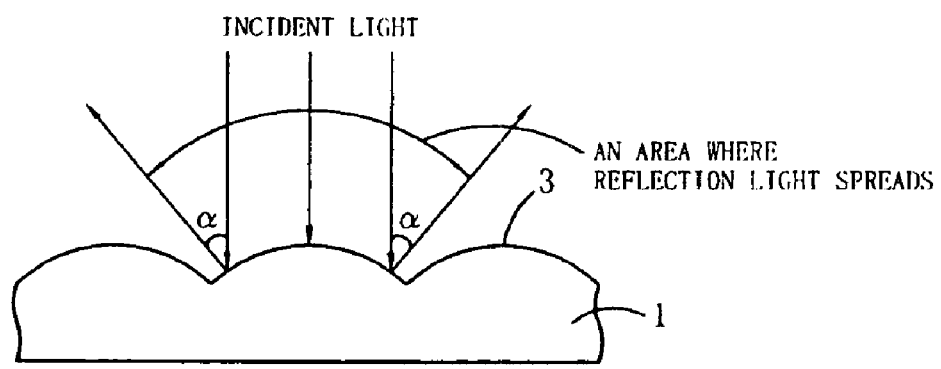
FIG. 3

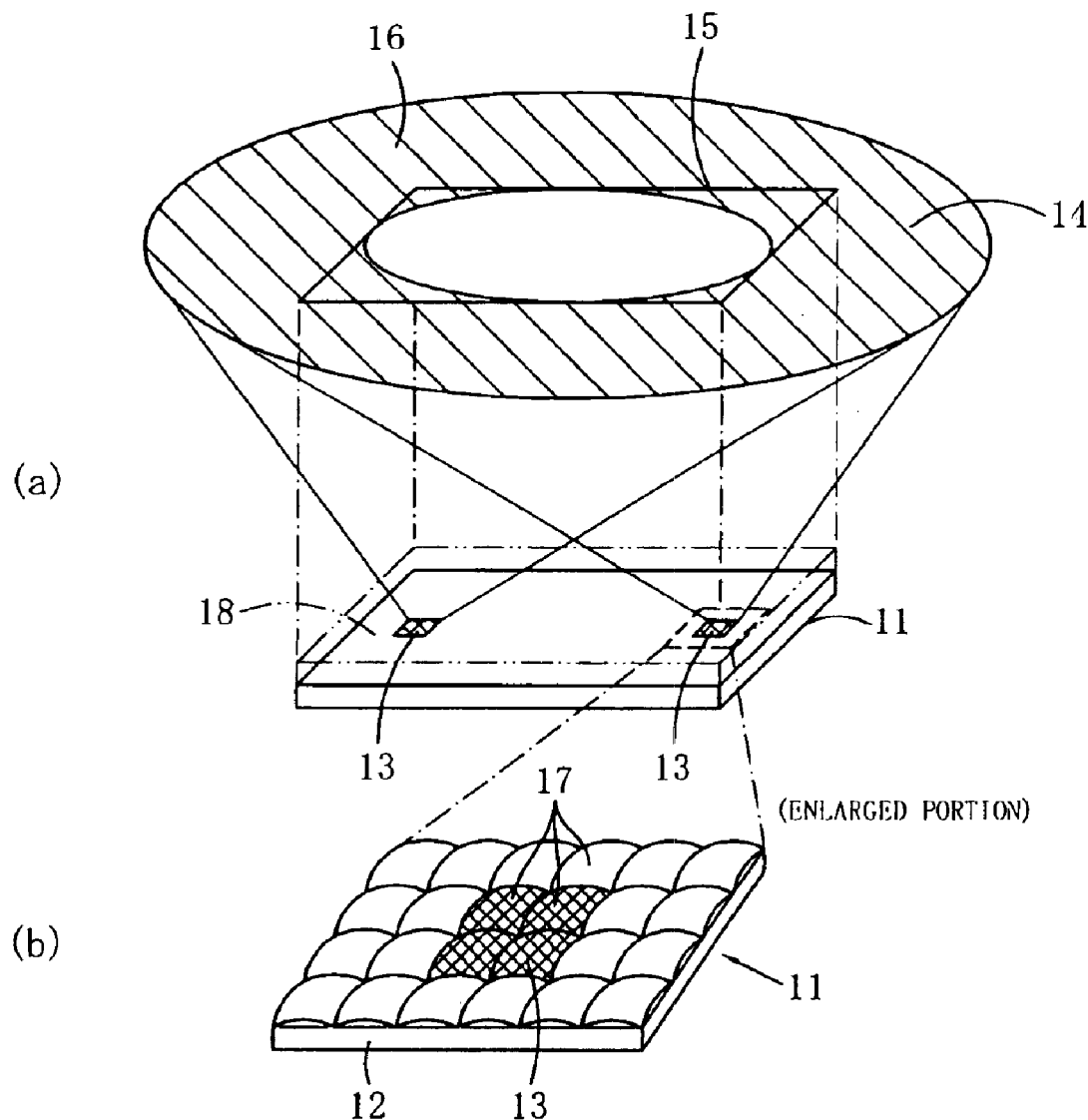
F I G. 7

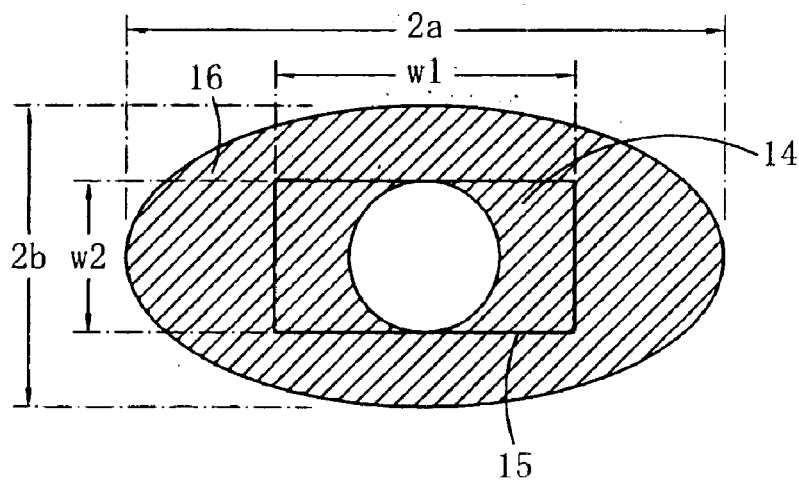
F I G. 1 5
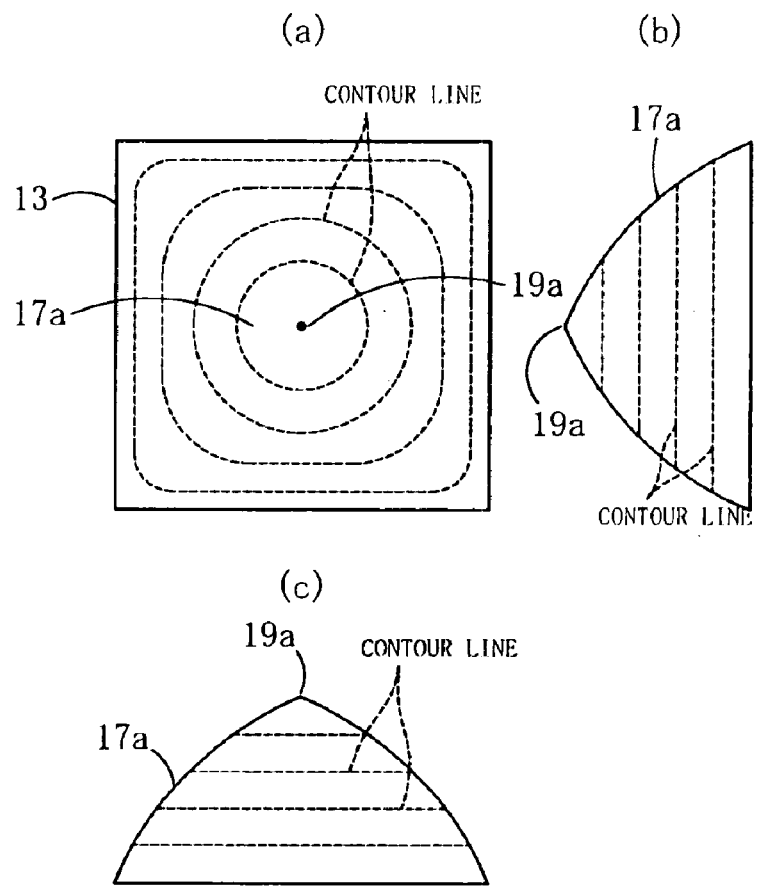
F I G. 1 6

(a) 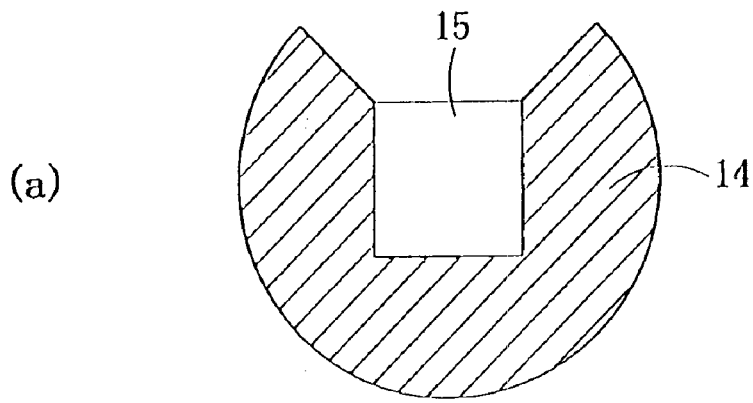
(b) 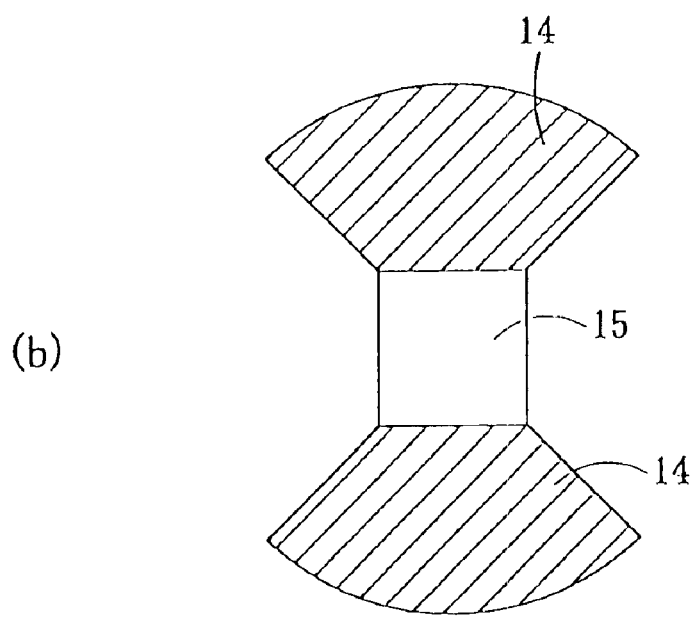
(c) 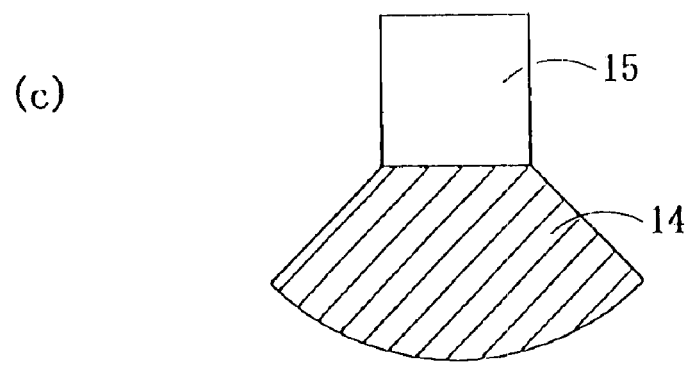
FIG. 23

(a)
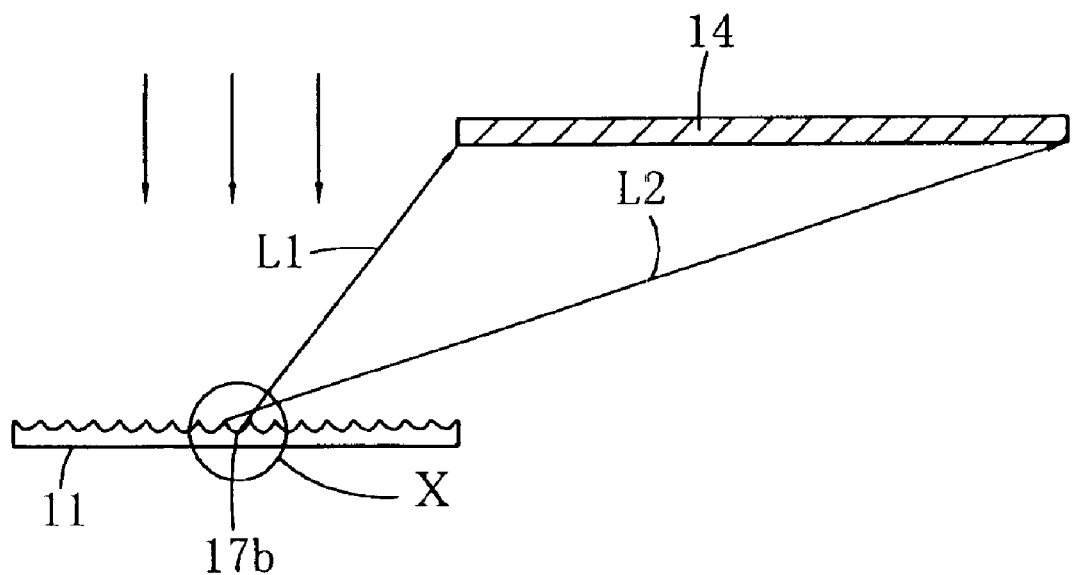
(b)
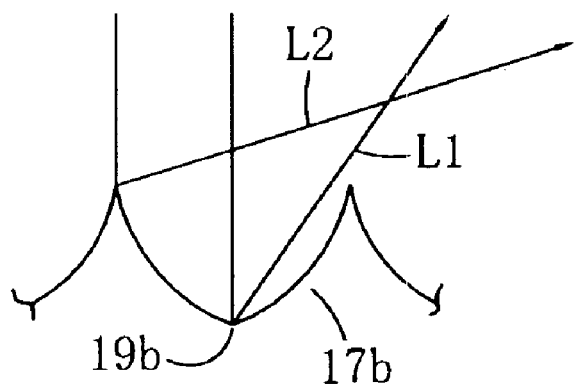
FIG. 32

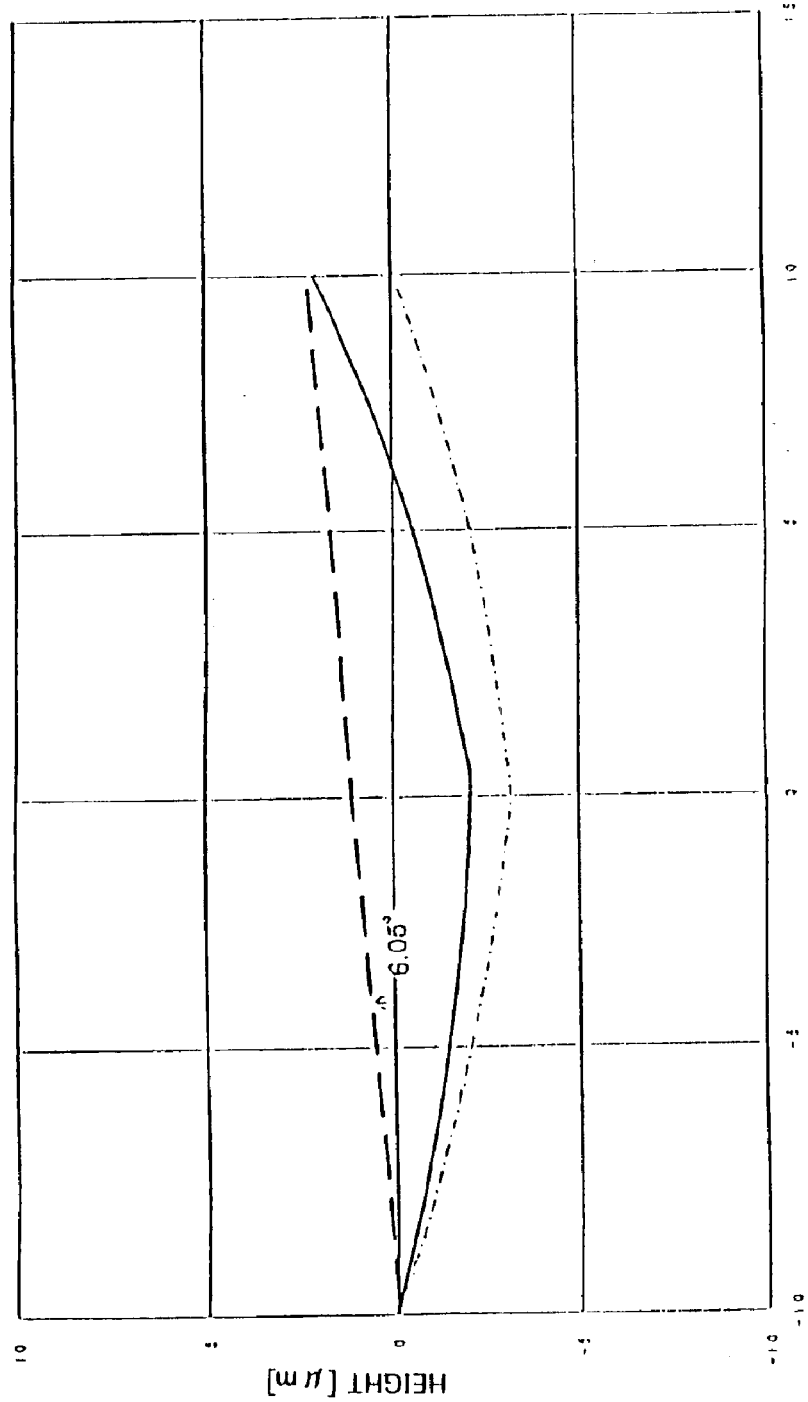
F I G. 4 1

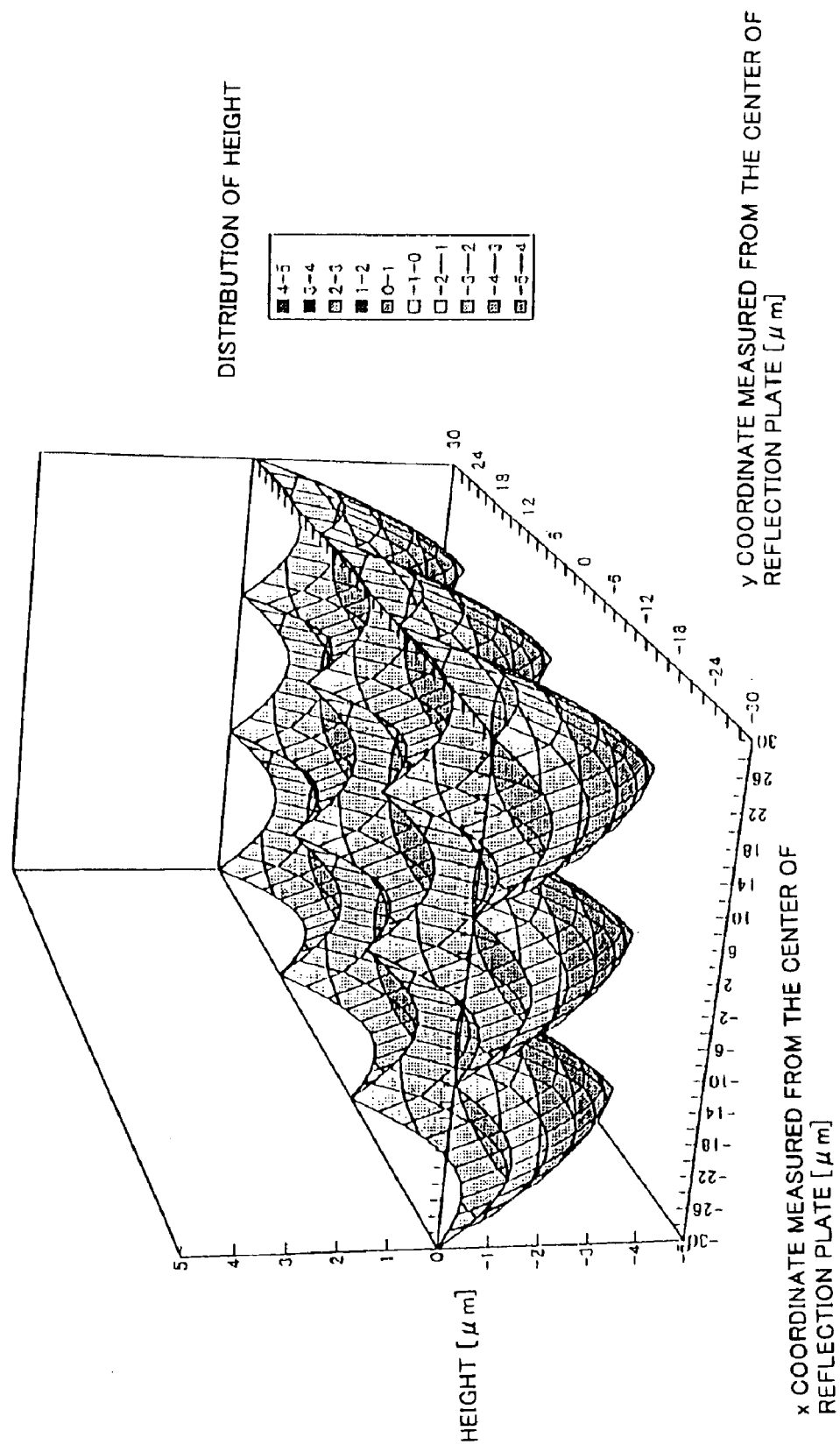
F I G. 44

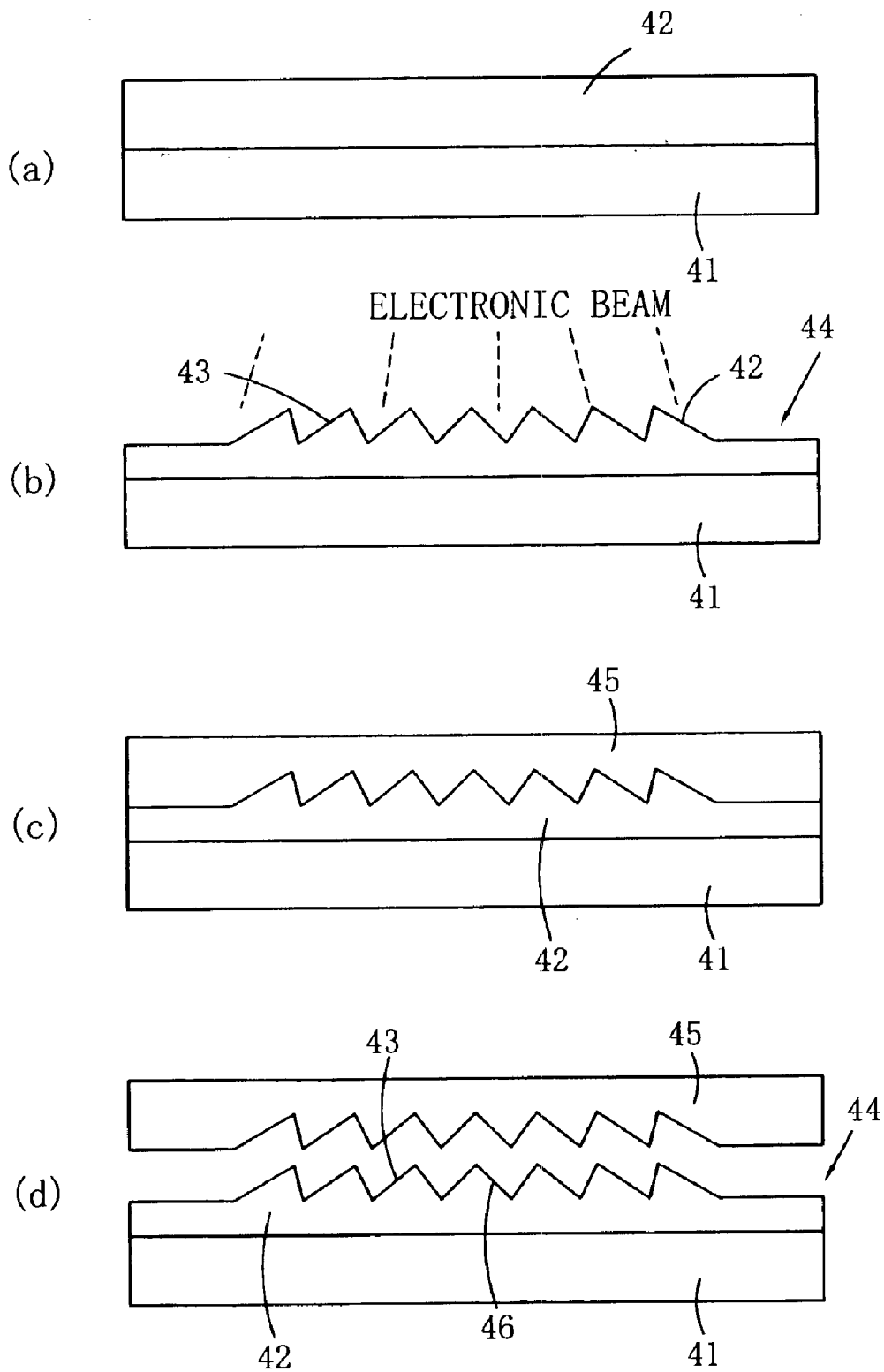
F I G. 4 9

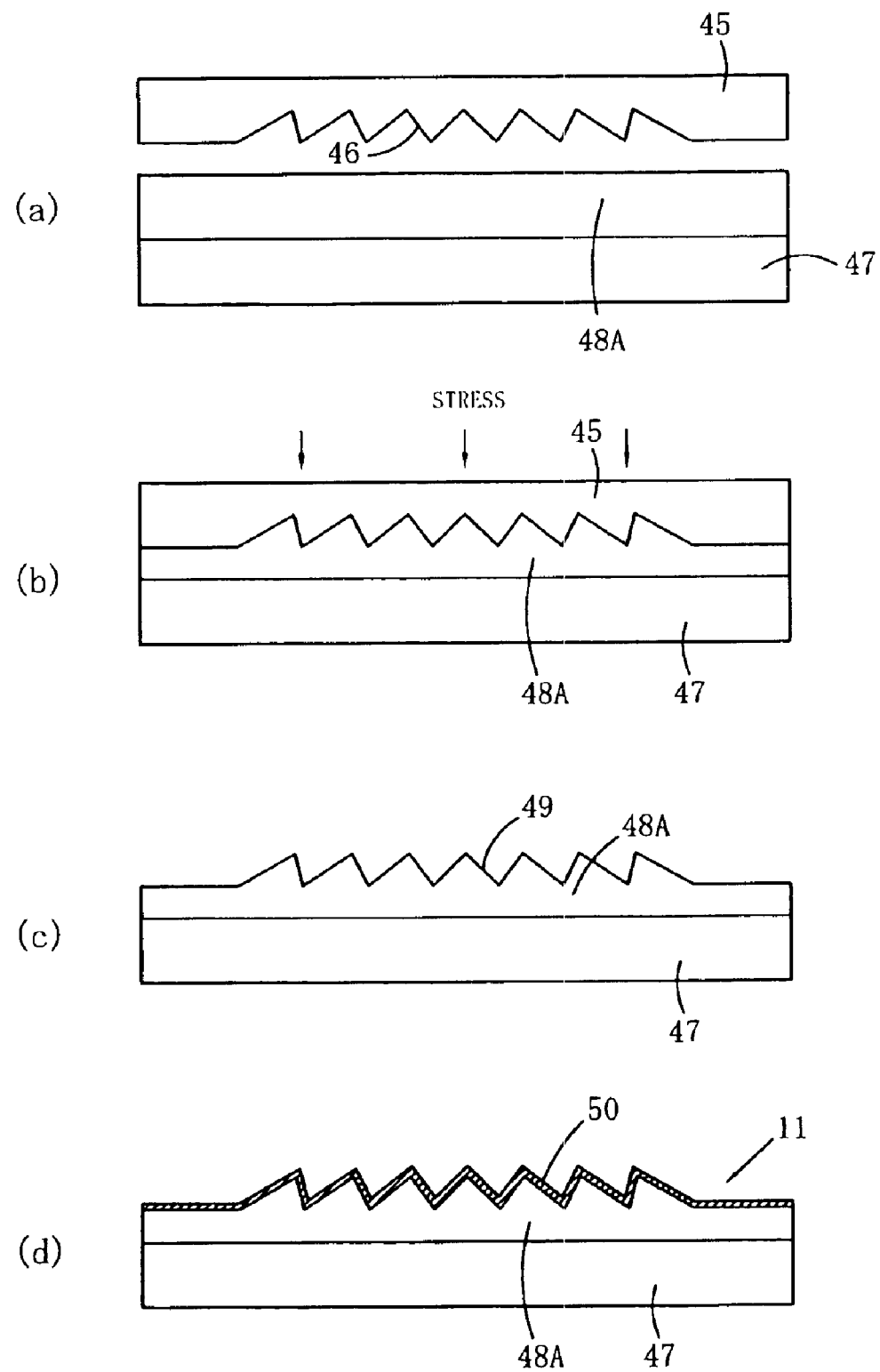
F I G. 5 1

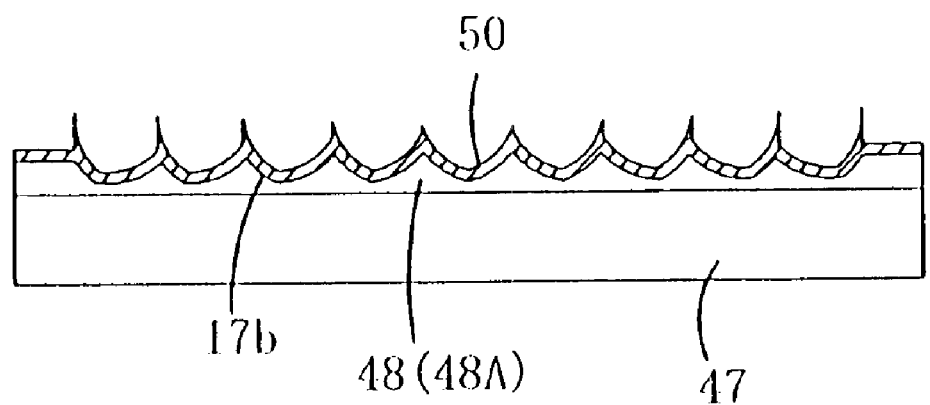
F I G. 5 2
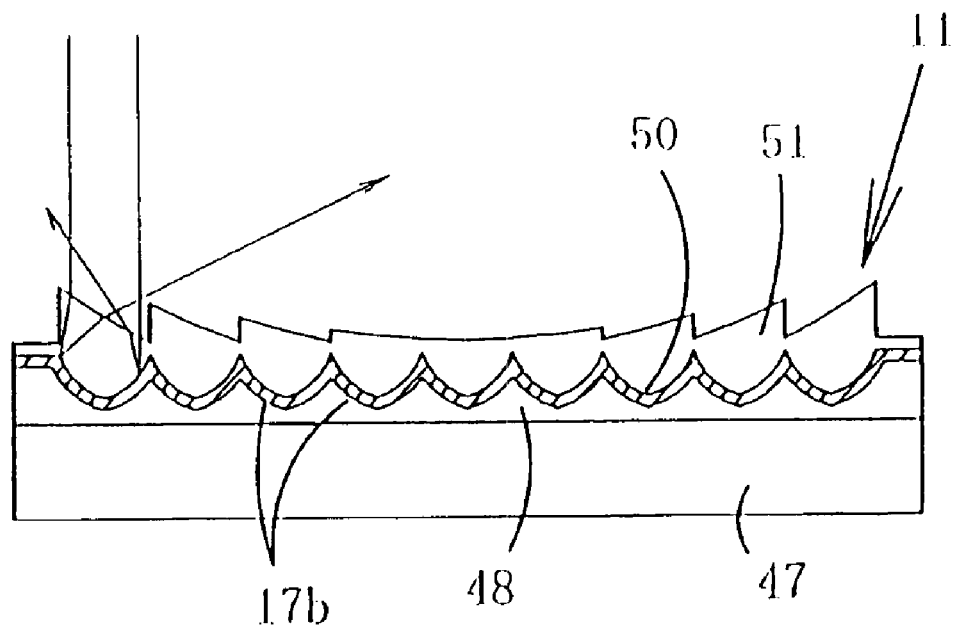
F I G. 5 3

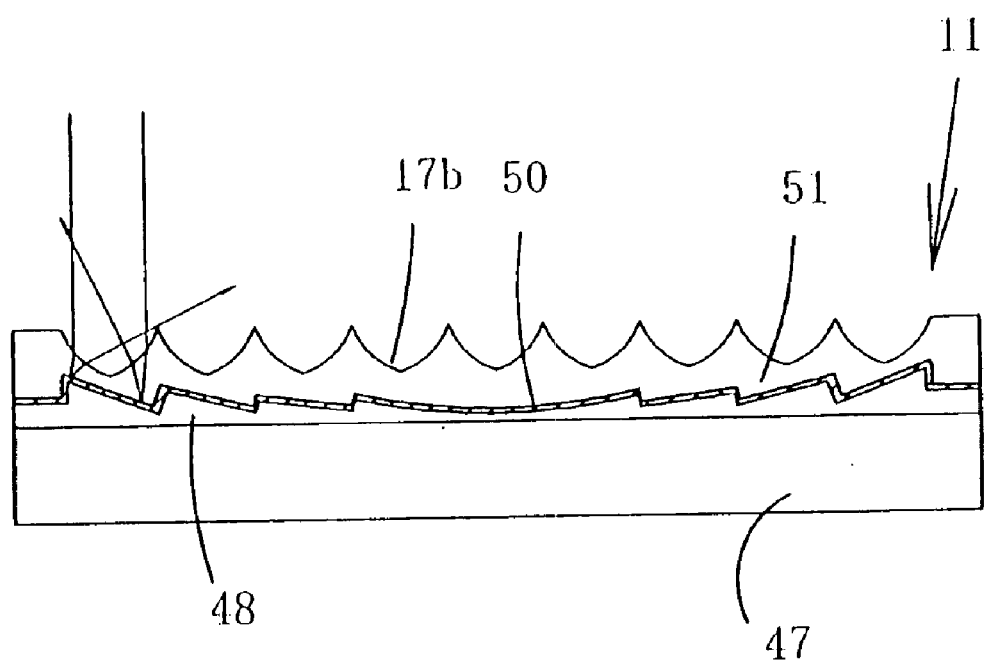
F I G. 5 4
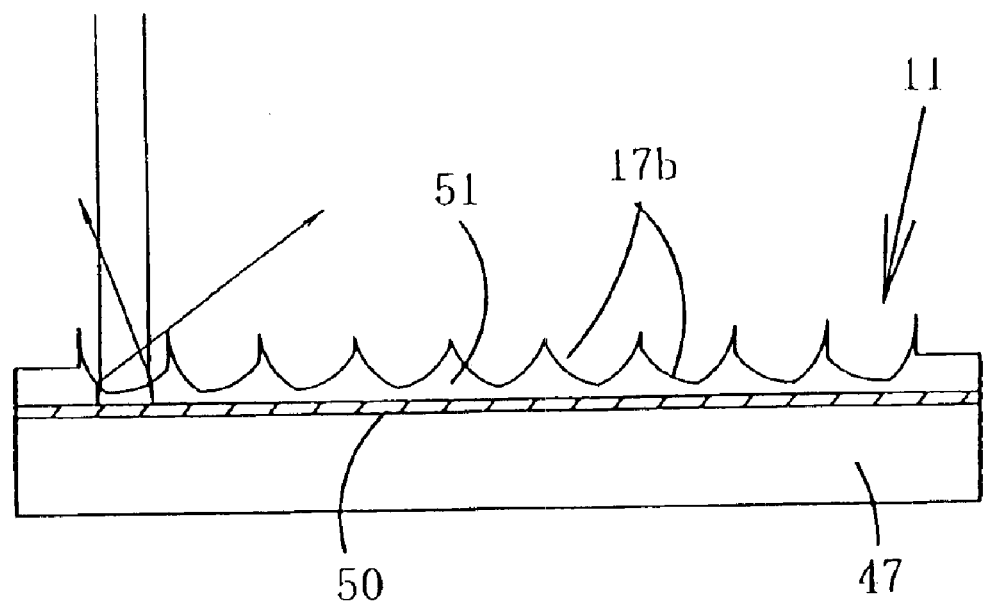
F I G. 5 5

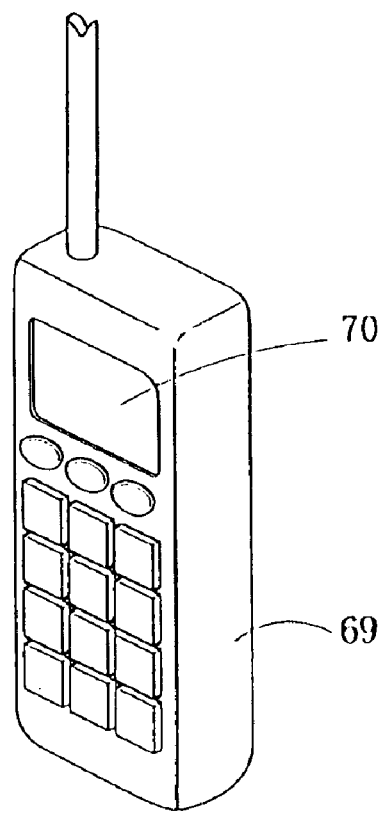
F I G. 5 7
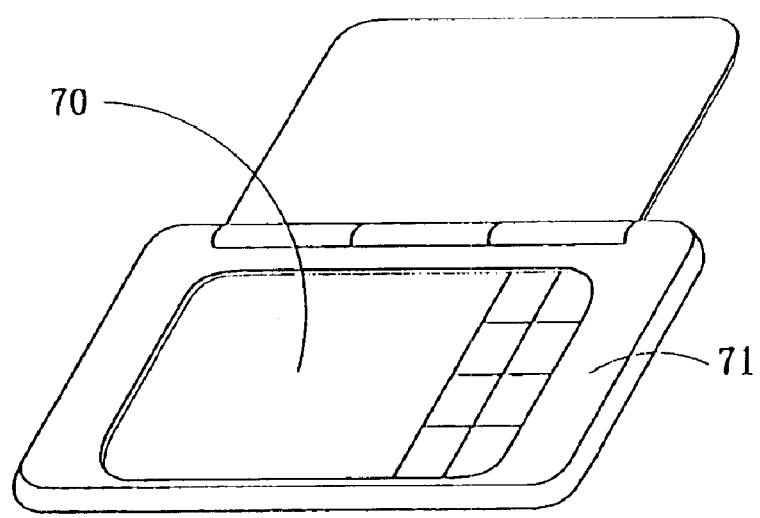
F I G. 5 8

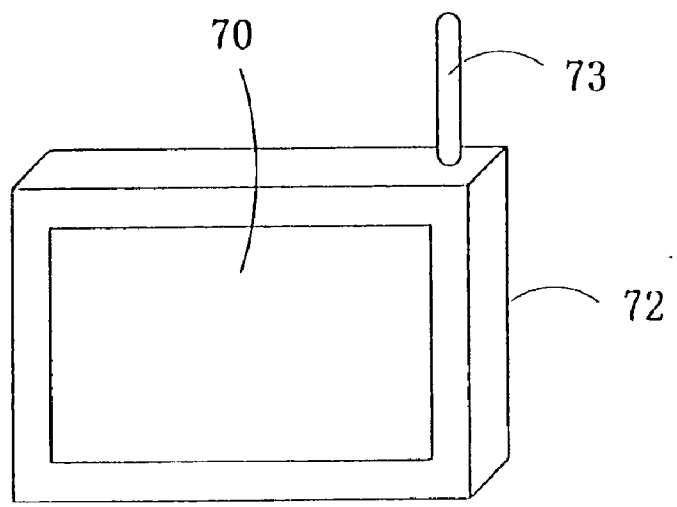
F I G. 5 9
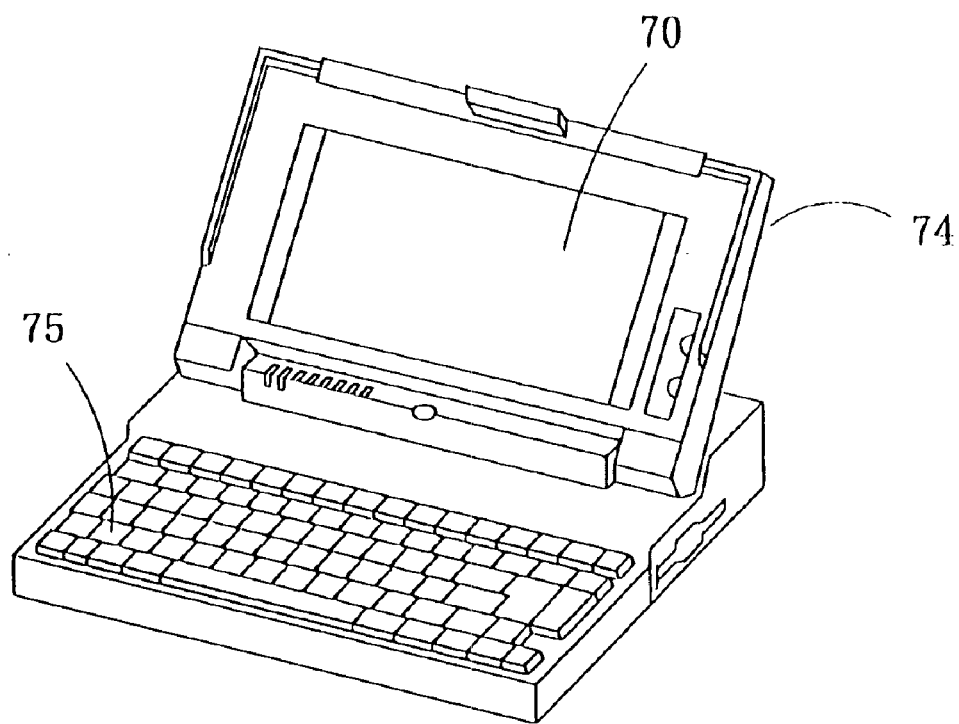
F I G. 6 0

APPARATUS AND METHOD FOR REFLECTING LIGHT INTO A SPECIFIED PLANE AREA

TECHNICAL FIELD OF INVENTION

The present invention relates to a reflecting member and a light reflecting method. More specifically, the invention relates to a reflecting that is used for a reflection type or a semi-transmission type display. Also, it relates to a light reflecting method for reflecting light by a reflecting member to an area which is different from a regular reflecting light. In addition, the invention relates to devices employing a reflecting member such as a liquid crystal display, a wireless information transmission device, a mobile information terminal, an image display device, etc. Furthermore, the invention relates to a method for producing the reflecting member, a stamper therefor, and a method for producing the same.

BACKGROUND OF INVENTION

Recently, liquid crystal displays have widely been applied as display devices of personal computers, television sets, word processing machines, video eras, etc. on the other hand, further higher performance such as downsizing, energy saving, cost reduction, etc., has been required of such apparatuses. In order to meet these requests, a reflection type liquid crystal device that is able to display by reflecting surrounding light incident from the peripheries without using any backlight (there is a type in which a backlight is used in a dark place) has been progressively developed.

In such a reflection type liquid crystal display, as any backlight is not used, it is important how much the display surface can be made bright by further efficiently utilizing the surrounding light. Therefore, a role achieved by a reflection plate, which is incorporated in the reflection type liquid crystal display, is remarkably important, wherein it is desired that a reflection plate having optimal reflection characteristics, which efficiently utilizes the surrounding light coming from any angle, is developed.

Basically, a reflection plate 1 used for a reflection type liquid crystal display device is, as shown in FIG. 1, disposed at the rear side of a liquid crystal panel 2, and regularly reflects the incident surrounding light. However, in such a simple reflection plate 1, a problem occurs in that the reflection light from the surface of the liquid crystal panel 2 is brought in. That is, when surrounding light such as sunlight, indoor illumination light, etc., is made incident into a liquid crystal device, a part of the surrounding light is reflected from the surface of the liquid crystal panel 2 as shown in FIG. 1, and the remaining surrounding light penetrates the liquid crystal panel 2 and is reflected by the reflection plate 1, wherein if the reflection direction of the reflection light on the surface of the liquid crystal panel 2 is identical to that of the reflection light by the reflection plate 1, the light source is brought in on image appearing on the liquid crystal device, and it becomes difficult to recognize the image. That is, visible recognition is worsened.

In order to solve these and other problems, such a type has been proposed, in which a pattern consisting of a number of recesses and projections 3 is arrayed on the surface of the reflection plate 1 as shown in FIG. 2(*a*) and incident light is scattered and reflected by the respective recesses and projections 3 as shown in FIG. 2(*b*). If it is devised that light incident into the reflection plate 1 is scattered by the recesses and projections 3, it is possible to observe the screen from a direction where a viewer is not disturbed by any light that is regularly reflected by the liquid crystal panel 2, wherein visible recognition performance of the liquid crystal display can be improved. In addition, where the recesses and projections 3 are designed so as to have a recess and projection profile by which an inclination angle of the recesses and projections 3 (an inclination angle of the tangential plane of the recesses and projections) do not exceed α as shown in FIG. 3, it is possible to control the emission direction of the reflection light so that the emission direction is not widened more than 2β, wherein, by adjusting the angle α, it becomes possible to make the screen bright by narrowing the angle of the field of vision or to widen the angle of the field of vision by sacrificing the brightness thereof.

However, since the recess and projection profile is the same at any position of the reflection plate 1 as shown in FIG. 2., light is reflected in useless directions, and utilization efficiency of the light is worsened. FIG. 4 is a view describing the above-described shortcoming. In the drawing, it is assumed that recesses and projections 3 are formed in the reflection plate 1 so that spread in the reflection direction becomes 2β. FIG. 4 shows light that is reflected at both left and right ends of the reflection plate 1 where the incident light is made incident vertically into the reflection plate 1. Area I is an area where no light reflected from the reflection plate 1 reaches (that is, an area where no screen is observed). Area II is an area where light reflected from only a part of the reflection plate 1 reaches (that is, an area where only a part of the screen is observed). Area IV is an area where, although light reflected from entire of the reflection plate can reach, no screen is observed since the light is hindered by entire of the reflection light of a liquid crystal panel 2. Area III is an area where entire of the screen of the liquid crystal panel 2 can be observed (That is, an effective field of vision area.).

Although, in FIG. 4, an area where the screen can be observed is expressed from a direction perpendicular to the reflection plate 1, FIG. 5 shows an area where a screen which is observed from the front side of the reflection plate 1 is observed. Herein, a case where light is made incident into one corner of the reflection plate 1 is taken into consideration. As shown in FIG. 6, since the light reflected by the reflection plate 1 spreads in a range of angle α, an area where the reflection light reaches enters the interior of a circle whose radius is h tan α centering around the perpendicular line erected at the corner of the reflection plate 1 where it is assumed that the distance to the point of view is h (that is, the distance to a position of an eye which observes a screen, for example, a distance of clear vision). Therefore, where consideration is taken with respect to a plane parallel to the reflection plate 1 including the point of view, only a part of light reflected by entire of the reflection plate reaches in Area II in FIG. 5, thereby allowing a part of the screen to be observed, and in Area I outside Area II, no light reflected by the reflection plate 1 reaches, thereby allowing no screen to be observed. In Area IV, although light reflected from entire of the reflection plate reaches, the light is hindered by regular reflection light brought about by the liquid crystal panel 2, thereby allowing no screen to be observed. Therefore, an area where light reflected from entire of the reflection plate reaches to allow the entire screen to be observed is only the area (Area III) indicated by diagonal lines in FIG. 5.

Thus, an area where the entire screen of the liquid crystal panel can be observed is only Area III in FIG. 4 or FIG. 5. In Areas II and IV, even if light reflected from the reflection plate 1 reaches, it is impossible to observe the entire screen, or since the reflected light is hindered by regular reflection light from a light source, it is impossible to observe images, wherein all light reflected toward Areas II and Iv because useless, and the screen observed from the direction of Area III resultantly becomes dark.

Also, as shown in FIG. 4 or FIG. 5, it is understood that an amount of light corresponding to the useless portions of light reflected toward useless directions by the reflection plate 1 is remarkable.

SUMMARY OF THE INVENTION

It is therefore an object of the present invention to provide a reflecting member that is used for a reflection type or semi-transmission type display device, which is able to decrease light reflected toward useless directions and improves utilization efficiency of incident light.

A reflecting member according to the invention is provided with a plurality of unit reflection areas, which are formed so as to reflect incident light to almost entire of a specified plane area established so that almost no regular reflection light is allowed to pass therethrough.

Regular reflection referred to herein indicates reflection that does not constitute any image and may hinder observation of images where it is used in terms of a display device. The regular reflection includes such a type as that regularly reflected from places other than unit reflection areas in a reflecting member and such a type as that regularly reflected by objects other than the reflecting member. In addition, although the direction of regular reflection is determined by the direction of incident light, the direction of incident light may vary in compliance with uses and use environments. Therefore, the direction of incident light is not fixed, but may be an incident direction in design, along which light is supposed to be made incident, taking uses and use environments into consideration. Further, a specified plane area is a plane or curvature that is supposed in forward space of the reflecting member, and it is not necessary for the specified plane area to be made parallel to the reflecting member.

A unit reflection area emits light to almost entire of the specified plane area, wherein light or an image, which is reflected from the unit reflection area can be observed at any place in the specified plane area. Furthermore, since the regular reflection light scarcely passes through the specified plane area, light or an image in the specified plane area is not hindered by regular reflection light, wherein the light or image can be clearly recognized. In addition, since light reflected by the unit reflection area is hardly emitted outside the specified plane area, it is possible to obtain a large amount of light or a bright image in the specified plane area, wherein high efficiency of light utilization can be achieved. In particular, where the reflecting member is combined with a display device for use, it is possible to recognize a clear image whose entirety is bright in the specified plane area.

It is not necessary that the unit reflection areas are provided on entire of the reflecting member. However, it is preferable that, where the unit reflection areas are used for a display device, the unit reflection areas are arrayed at almost the entirety at places corresponding to at least an image.

Such a reflecting member may be used in the form of a reflection plate having recesses and projections. Here, recesses and projections may be provided on the surface of the reflection plate. The recesses and projections may be provided on the rear surface of a transparent reflection plate. Further, it is preferable that the above-described unit reflection area is formed so as to be shaped in response to the arraying position thereof. Although light unevenness can be made slight by minutely producing the unit reflection areas, it is favorable that the unit reflection areas are formed to be minute in comparison with pixels particularly for a display device. Also, in order to emit light to the same plane areas by unit reflection areas located apart from each other, it is necessary to make the shapes of the recesses and projections of the respective unit reflection areas different from each other.

Also, although it is not necessarily a requisite that all of incident light fluxes are collected in a specified plane area, it is usual that 70% or more of the incident light fluxes are emitted to the above-described specified plane area. In addition, where it is used for a display device, an image can be made bright.

On the other hand, where the specified plane area is disposed so as to surround the emission area of regular reflection light, there is no other method than to allow 30% or less of light reflected by a plurality of unit reflection areas to be emitted from the emission area of regular reflection light.

It is preferable that the above-described unit reflection areas are formed of at least a single projection or recess not having any plane perpendicular to the incident light. Where the unit reflection areas do not have any plane perpendicular to the incident light, it becomes difficult for light reflected by the reflecting member to be emitted toward the emission area of regular reflection light, wherein a loss of light can be decreased.

With respect to the reflecting member according to the present invention, in order to form unit reflection areas so as to reflect the incident light to almost entire of the specified plane areas established so that almost no regular reflection light is allowed to pass therethrough, for example, the unit reflection areas are formed of at least a single projection, and the top point of the projection is positioned on a segment drawn from the center of the unit reflection area to the center of the above-described specified plane area, and at the same time, is biased toward the center side of the above-described specified plane area. As a result, the positions of the top points of the projections in the unit reflection areas are made, little by little, different from each other on the basis of a distance of the unit reflection area from the center of the above-described specified plane area.

Similarly, wherein the unit reflection area is formed of at least a single recess, the lowest point of the recess is located at an extension of a segment drawn from the center of the specified plane area to the center of the unit reflection area, and at the same time, is biased towards a side farther from the center of the specified plane area. In this case, the positions of the lowest points of the recesses in the above-described unit reflection area become, little by little, different from each other with respect to a distance of the unit reflection area from the center of the above-described specified plane area.

Also, the unit reflection area may be composed of a reflection layer for reflecting light and an optical path converting layer, which leads the light reflected by the reflection layer to the above-described specified plane area, as the reflecting member of the invention. Thus, if the light reflected by the reflecting member on the basis of the reflection layer and optical path converting layer is hardly emitted to the emission area of regular reflection light, the freedom of design can be widened, and design of the reflecting member can be facilitated.

A method for reflecting light according to the invention is featured in that light incident from outside is reflected by a reflecting member having a plurality of unit reflection areas, and light reflected by the reflecting member is emitted to almost entire of a specified plane area established so that the regular reflection light hardly passes therethrough.

Since unit reflection areas provided on the reflecting member emit light to almost entire of a specified plane area, light or an image, which is reflected by the unit reflection areas can be observed from anywhere on the specified plane area. In addition, since regular reflection light hardly passes through the specified plane area, and the light and image on the specified plane area are not hindered by the regular reflection light, the light and image can be clearly recognized. Further, since almost no light reflected by the unit reflection areas is emitted outside the specified plane area, it is possible to obtain a large amount of light or a bright image on the specified plane area, wherein high efficiency of light utilization can be achieved. In particular, if the reflecting member is combined with a display device for use, it is possible to recognize a clear image, whose entirety is bright, in the specified plane area.

In the method for reflecting light, it is usual that 70% or more of the incident light fluxes are emitted to the above-describe specified plane area. In addition, where it is used for a display device, an image can be made bright. Similarly, in fact, there is no other method than to allow 30% or less of the reflection light to be emitted to the emission area of the above-described regular reflection light, whose surrounding is enclosed by the above-described specified plane area.

If a stamper provided with an inverted profile of the recesses and projections which the reflecting member has is used for production of the reflecting member according to the invention, it is possible to efficiently mass-produce the reflecting ers. That is, in order to produce the reflecting members by using the stamper, wherein after the stamper is filled with resin and the resin is hardened, a molded article is removed from the stamper. Thereby, the reflecting members can be efficiently produced. Or, it is possible to efficiently produce the reflecting members by producing molded articles by mans of pressing work using the stamper. Thus, if a reflection film formed of a metallic thin membrane is formed on the surface of the molded article after the reflecting is produced, a reflecting member having high reflectivity can be brought about.

In addition, the stamper can be produced by transferring the shape of an original board onto a stamper material such as metal, resin, etc., by peeling off the stamper material from the original board after the stamper material such as the above is deposited on the original board having the same shape as a plurality of unit reflection areas which the reflecting member has.

The reflecting member according to the invention is typically used as a reflecting member for a liquid crystal display device. In particular, if at least a sheet of a plurality of substrates that holds a liquid crystal layer therebetween is composed of the reflecting member according to the invention, the number of components can be reduced, and thinning of the liquid crystal display device can be achieved.

In addition, by using the liquid crystal display device for a display, the present invention can be applied to wireless information transmission devices provided with transmitting and receiving features such as mobile telephones, weak-power radios, bile information terminals provided with an information processing feature, and image displaying devices, for displaying images, of television sets, computers, etc., Also, the above-described components of the invention can be combined as optionally as possible.

BRIEF DESCRIPTION OF THE DRAWINGS

FIG. 2(a) is a perspective view showing a structure of a reflection plate for which the problems of the above-described prior art liquid crystal display device shown in FIG. 1 can be solved, and FIG. 2(b) is a view describing the actions thereof;

FIG. 3 is an enlarged view showing recesses and projections, which are provided in the reflection plate shown in FIG. 2(a) and showing a state where light is reflected by the recesses and projections;

FIG. 7 is a rough perspective view showing a reflection type liquid crystal display device using a reflection plate according to one embodiment of the invention, and also showing a partially enlarged portion of the reflection plate;

FIG. 15 is a view showing a relationship between the emission area and a shining area;

FIGS. 16(a), (b) and (c) are, respectively, a plan view, a side elevational view and a front elevational view showing the shape of a projection to obtain light distribution as in FIG. 15;

FIGS. 23(a), (b) and (c) are general views each showing the emission areas of various patterns;

FIG. 32(a) is a view describing a method for designing a recess of the same reflection plate, and FIG. 32(b) is an enlarged view of the X portion in FIG. 32(a);

FIG. 41 is a view showing a detailed designing example of a recess, which shows a recess located apart from the middle;

FIG. 44 is a perspective view showing arrays of recesses in the vicinity of the center of the reflection plate by discriminating the same with gradations on the basis of heights;

FIGS. 49(a), (b), (c) and (d) are views describing a producing process of a stamper;

FIGS. 51(a), (b), (c) and (d) are general cross-sectional views showing another method for producing a reflection plate using the stamper produced in FIG. 49;

FIG. 52 is a cross-sectional view of a reflection plate according to still another embodiment of the invention;

FIG. 53 is a general cross-sectional view showing a reflection plate using an optical path converting layer;

FIG. 54 is a general cross-sectional view showing another reflection plate using an optical path converting layer;

FIG. 55 is a general cross-sectional view showing still another reflection plate using an optical path converting layer;

FIG. 57 is a perspective view showing a wireless information transmission device;

FIG. 58 is a perspective view showing a mobile information terminal;

FIG. 59 is a perspective view showing a television set; and

FIG. 60 is a perspective view showing a personal computer.

DETAILED DESCRIPTION OF THE INVENTION

Figure 1:
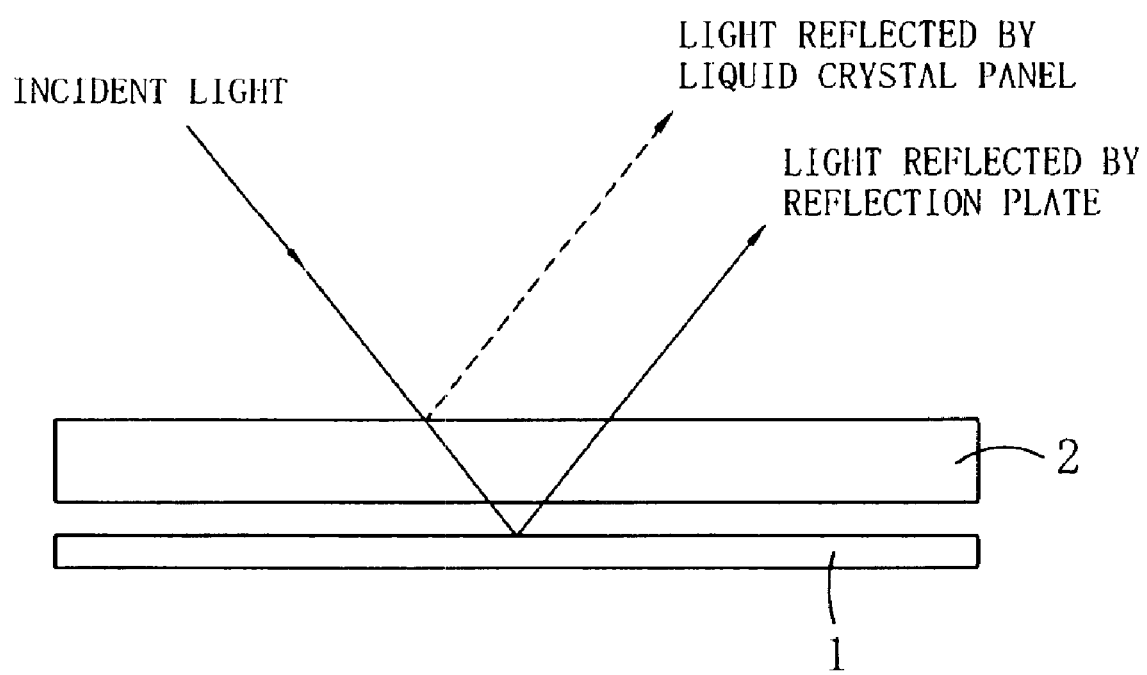
FIG. 1 is a view describing problems in a prior art reflection type liquid crystal display device.
Figure 4:
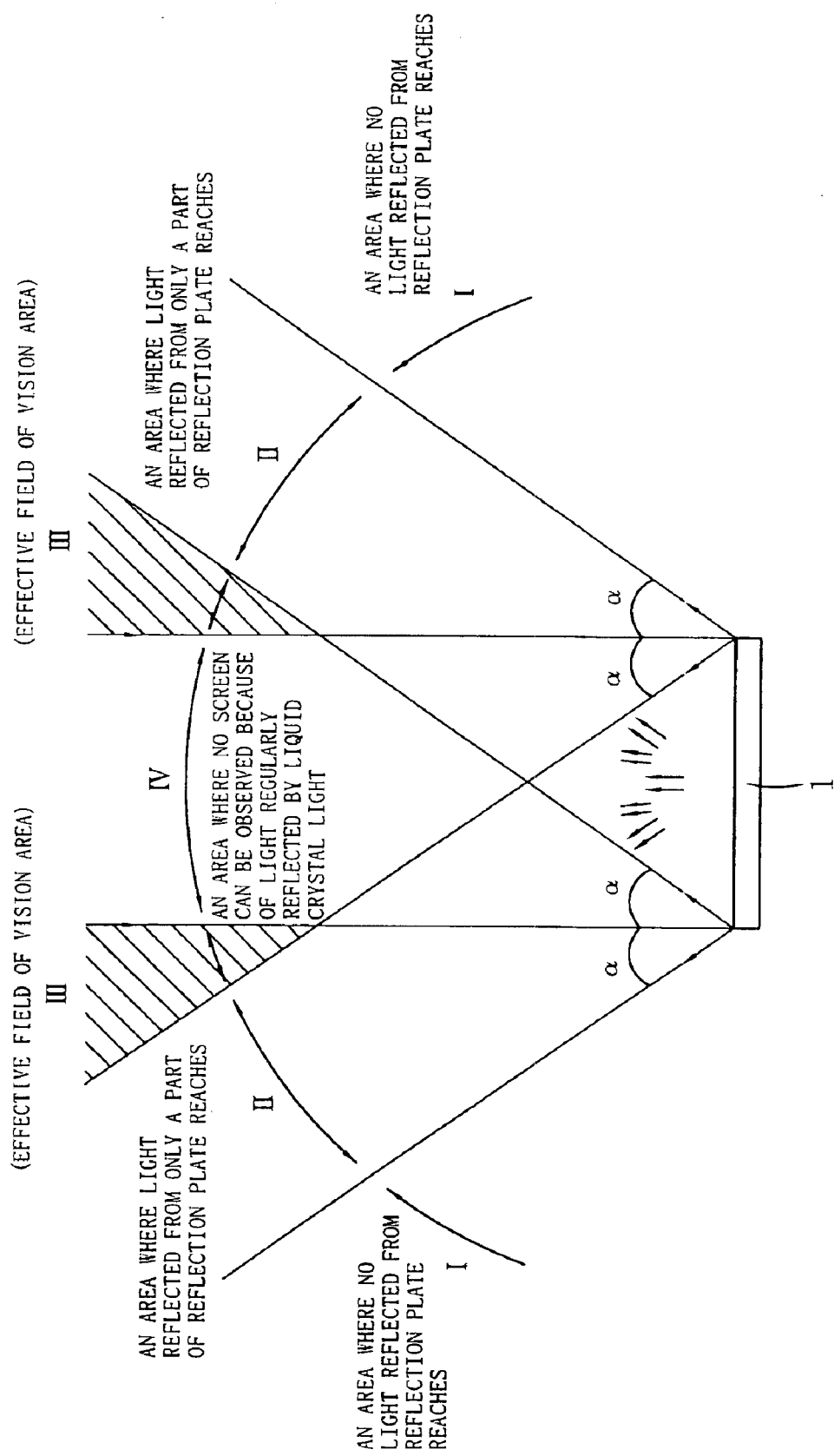
FIG. 4 is a view showing behaviors of the light reflected by the reflection plate shown in FIG. 2(a)
Figure 5:
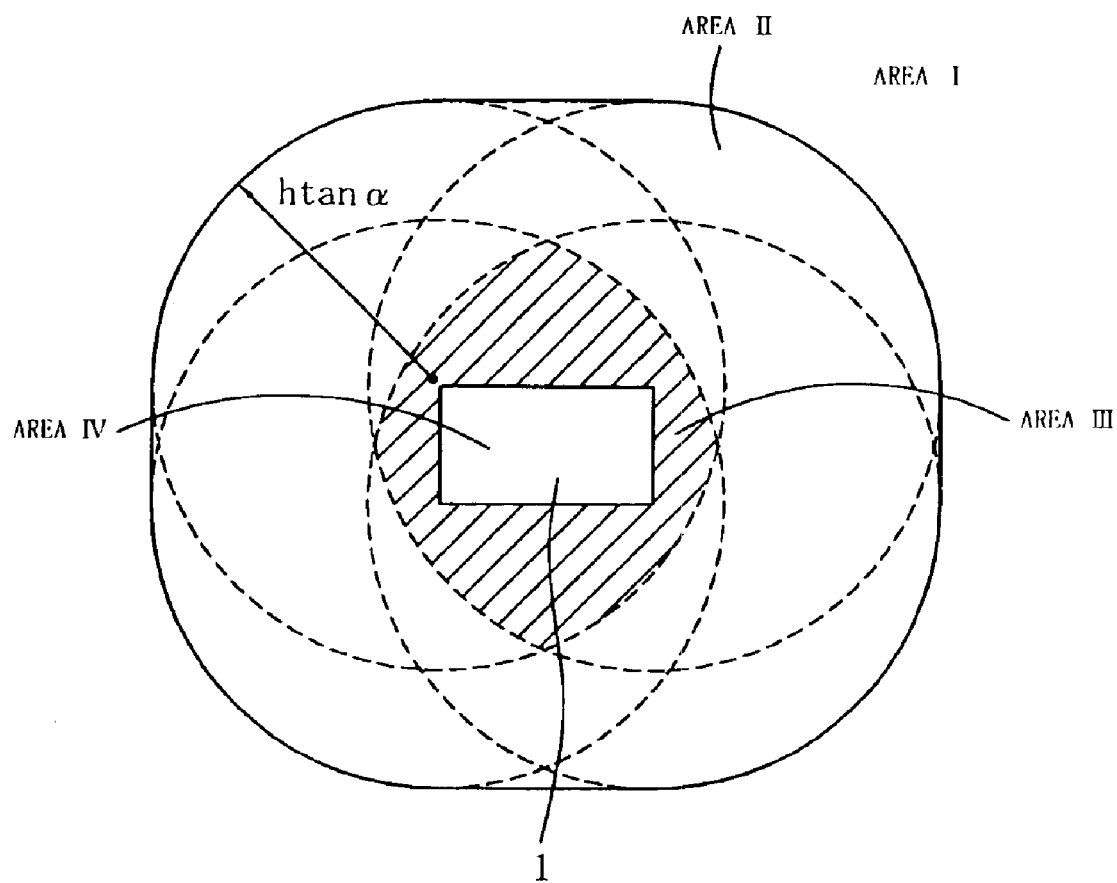
FIG. 5 is a view showing the behaviors of the light reflected by the reflection plate shown in FIG. 2(a) when being observed from the plane opposed to the reflection plate.
Figure 6:
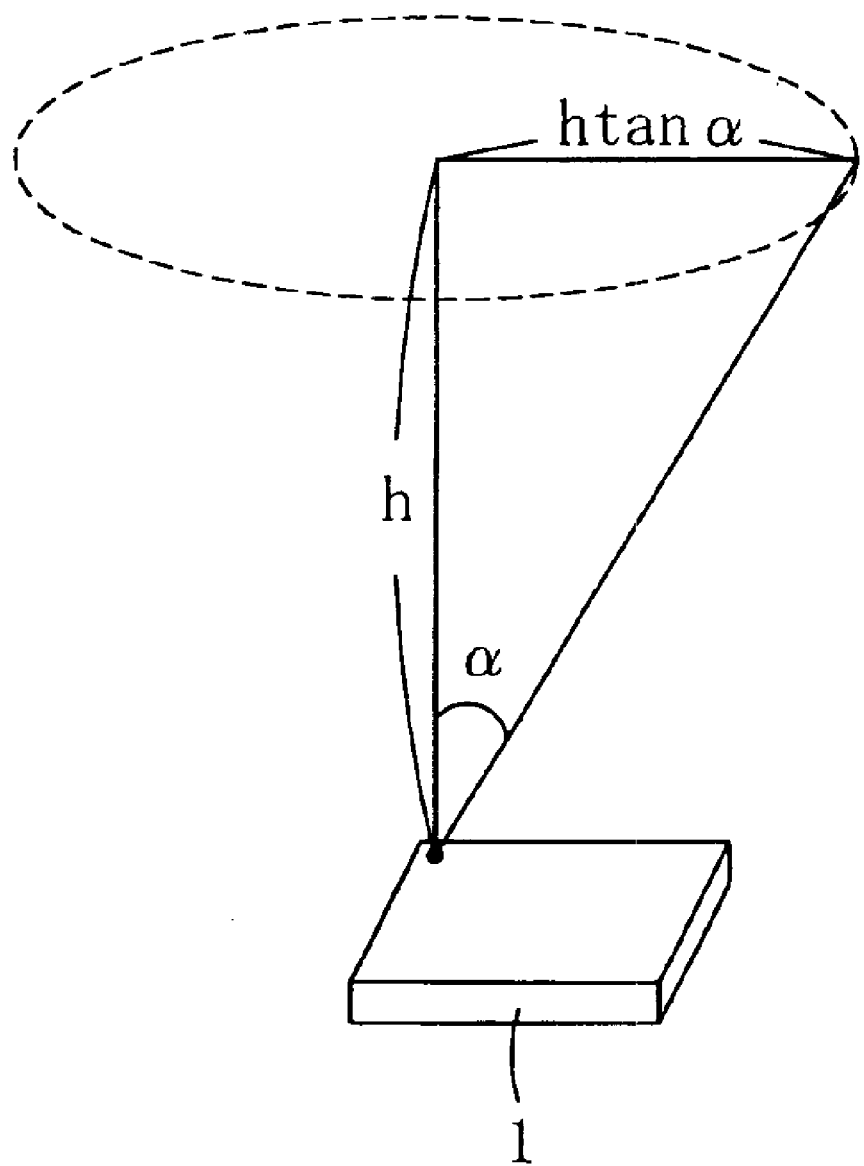
FIG. 6 is a supplementary view describing FIG. 5.

With reference to the drawings, a description is given of preferred embodiments of the invention hereinafter.

FIG. 7(a) is a rough perspective view describing the basic construction and actions of a reflection plate 11 according to one embodiment of the invention, and FIG. 7(b) enlarges and shows a part of the reflection plate 11. The reflection plate 11 is composed by arraying a number of unit reflection areas 13 (in FIG. 7, only one unit reflection area 13 is meshed) on a substrate 12. Light entering from a specified direction with respect to respective unit reflection areas 13 is projected so as to be made almost coincident with a specified plane area 14 (hereinafter called an "emission area") on a specified plane (a plane or a curvature where a point of view is supposed to exist). That is, light reflected by respective unit reflection areas 13 overlaps each other on the emission area 14 on a specified plane, and reflection light of the entire reflection plate is condensed so as to be overlapped on the emission area 14. Therefore, where unit reflection areas 13 are formed corresponding to the entire screen, it is possible to observe the entire screen at the emission area 14.

In addition, although it is preferable that light reflected from the reflection plate 11 is reflected in the surrounding of regular reflection light reflected by the surface of the liquid crystal panel 18 and is emitted so as not to overlap the emission area 15 (hereinafter called a "shining area") of regular reflection light on a specified plane, the light may partially overlap the shining area 15 as shown in FIG. 7. Therefore, where the emission area 14 overlaps the shining area 15 on the specified plane, an area excluding an area, which overlaps the shining area 15, from the emission area 14 becomes an effective field of vision area 16 while, where the emission area 14 does not overlap the shining area 15, the emission area 14 is agreed with the effective field of vision area 16. Also, even if the emission area 14 overlaps the shining area 15 and the overlapping area is slight, the emission area 14 is almost in agreement with the effective field of vision area 16.

The entire screen can be observed in the above-described emission area 14 formed to be wide ring-like. However, since light reflected from respective unit reflection areas 13 of the reflection plate 11 is not projected outside a common emission-area 14, it becomes possible to reduce light which is reflected in useless directions along which only a part of the screen can be observed, wherein light utilization efficiency can be improved, and the screen of a liquid crystal panel 18 can be made bright. Especially, even if a range at which the entire screen can be observed is widened by widening the effective field of vision area 16, the screen scarcely becomes dark, wherein recognition characteristics can be improved. If the reflecting member is used for a liquid crystal display device, quality of the liquid crystal display device can be improved.

Further, since the emission area 14 of the light reflected by the reflection plate 11 does not overlap the shining area 15 brought about by regular reflection light that is regularly reflected on the surface of the liquid crystal panel 18, or the overlapping portion thereof is slight, it is possible to reduce light that is reflected in useless directions along which a screen cannot be observed by being hindered by the regular reflection light, and the light utilization efficiency thereof can be further improved, wherein a screen of the liquid crystal panel 18 becomes bright and the recognition characteristics thereof are improved.

Figure 8:
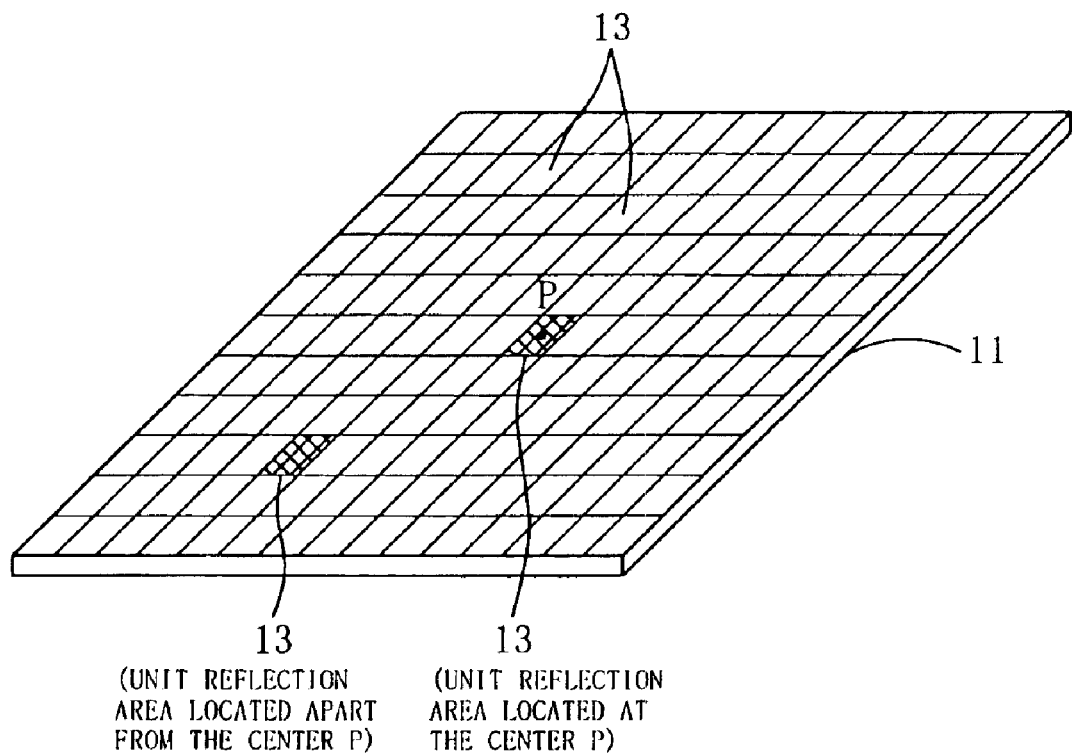
FIG. 8 is a perspective view showing arrays of unit reflection areas in the reflection plate shown in FIG. 7.

The respective unit reflection areas 13 are composed of a single recess and projection 17 or a plurality of recesses and projections 17, and the unit reflection areas 13 are basically arrayed cyclically or regularly as shown in FIG. 8. However, these unit reflection areas 13 may be arrayed at random as mentioned later. Also, the recesses and projections 17 that constitute the unit reflection areas 13 may be arrayed cyclically or regularly. These recesses and projections may be disposed at random.

In addition, a description is given of a surface reflection type reflection plate, having a recess and projection pattern formed on the surface thereof, for reflecting incident light by the surface of the respective recesses and projections. However, a rear-side reflection type reflection plate may be acceptable, in which a substrate is formed of glass or transparent resin, and incident light is reflected by a recess and projection pattern formed on the rear side of the substrate.

Figure 9:
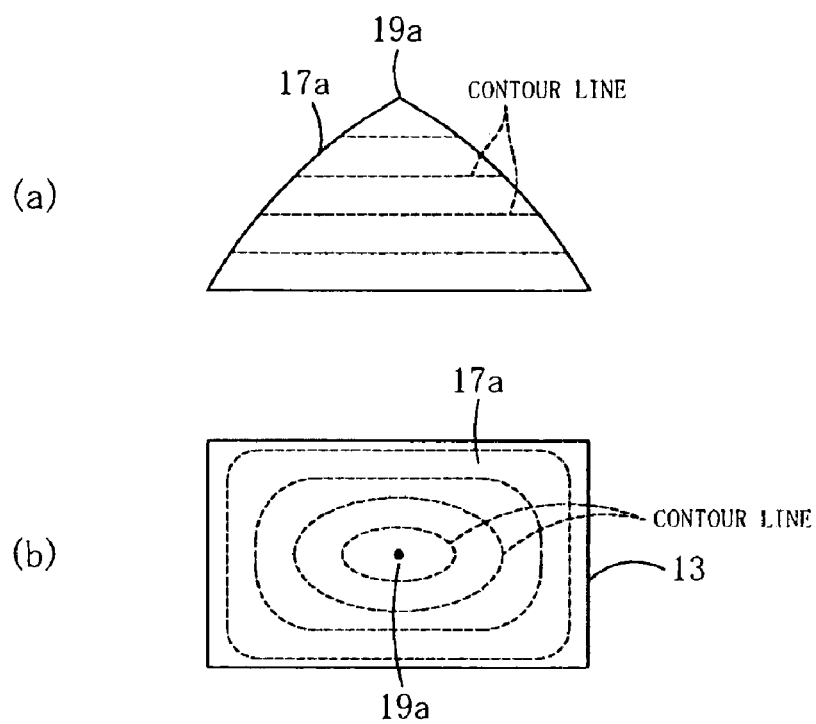
FIG. 9(a) is a front elevational view of a projection positioned at the middle of the reflection plate.
FIG. 9(b) is a plan view thereof.
Figure 10:
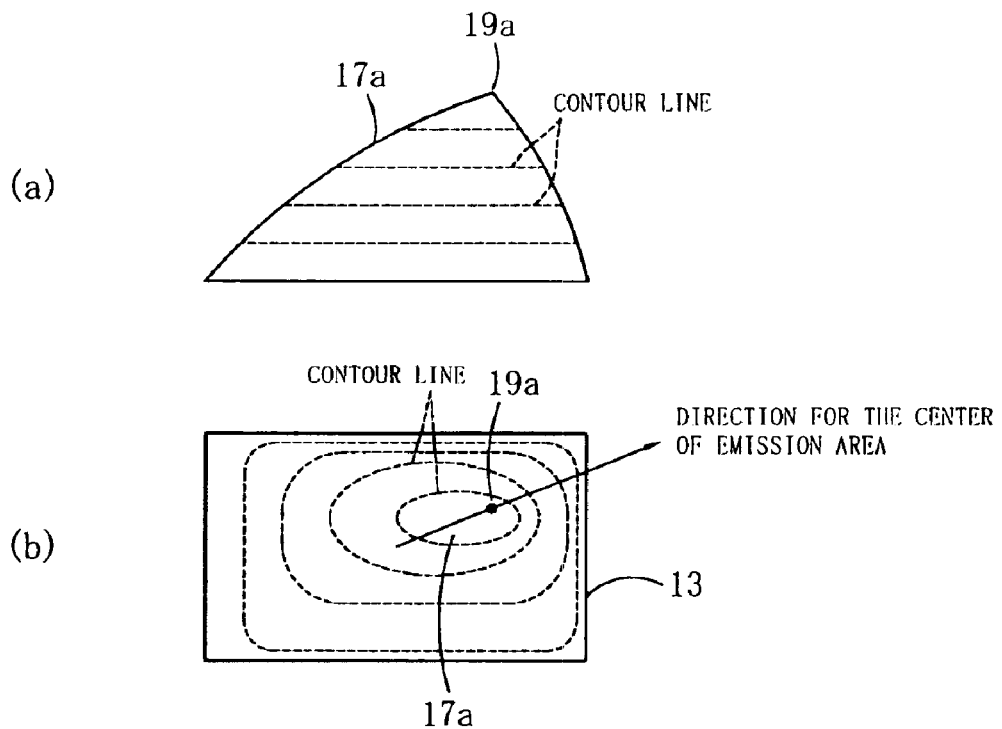
FIG. 10(a) is a front elevational view of a projection located apart from the center of the reflection plate.
FIG. 10(b) is a plan view thereof.

Next, a description is given of a detailed structure of a unit reflection areas 13. A reflection plate 11 shown in FIG. 8 is such a type in which unit reflection areas 13 are cyclically arrayed like a matrix (in a checkered form). FIG. 9(a) is a front elevational view of a unit reflection area 13 located at the center P of the reflection plate 11, and FIG. 9(b) is a plan view (contour-lined view) thereof. FIG. 10(a) is a front elevational view of a unit reflection area 13 located apart from the center P of the reflection plate 11, and FIG. 10(b) is a plan view (contour-lined view) thereof. In addition, the unit reflection areas 13 may be arrayed concentrically centering around the center P of the reflection plate 11.

In the reflection plate 11, the respective unit reflection areas 13 are composed of a single projection 17a, and the respective projections 17a have a roughly quadrangular pyramid-shaped or a roughly cone-shaped curved surface. The shape (or distribution of inclination angles) of inclined and curved planes between the top 19a of the projection 17a and four sides of the unit reflection area 13 is designed corresponding to the target emission areas. Since the projection 17a does not have any plane (tangential plane) perpendicular to the incident light but has a steep top, almost no reflection light brought about by the projection 17a is reflected to the front surface (in the regular reflection direction) of the reflection plate 11.

Figure 11:
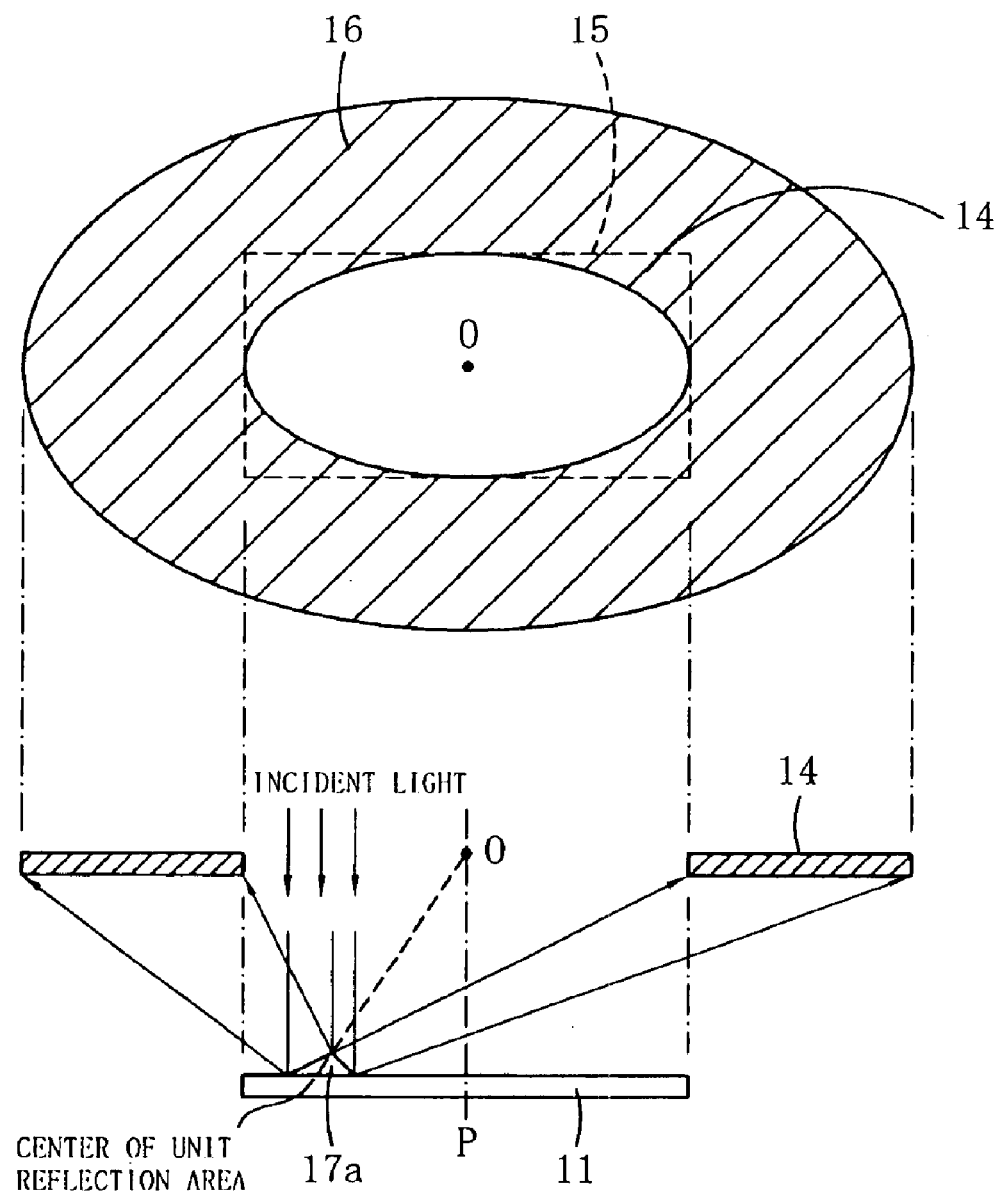
FIG. 11 is a view showing a state where light is emitted to the emission area by a projection located apart from the center of the reflection plate.
Figure 12:
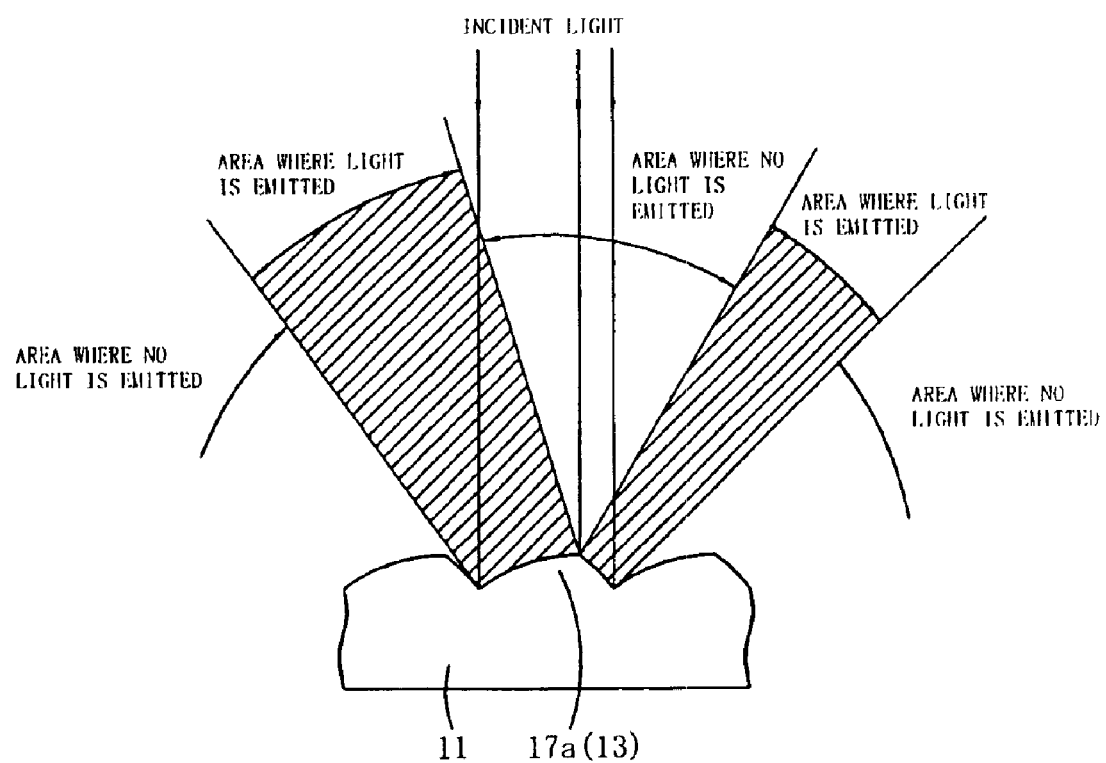
FIG. 12 is a view showing behaviors of the light reflected by the projection shown in FIG. 11.

Since it is necessary to reflect light to a common emission area 14 by projections 17a located at different positions, the detailed shapes of the projections 17a are minutely different from each other in response to changes in the positions where the unit reflection areas 13 are located. For example, as shown in FIGS. 9(a) and (b), in the unit reflection area 13 located at the center P of the reflection plate 11, the top 19a of the projection 17a is located above in the perpendicular direction of the center of the unit reflection area 13, wherein the projection 17a can reflect light in both directions at almost the same amount. To the contrary, as shown in FIG. 11, in the unit reflection area 13 located apart from the center P of the reflection plate 11, the top 19a of the projection 17a is located above a segment drawn from the center of the unit reflection area 13 to the center O of the emission area 14, and the top 19a of the projection 17a is biased toward the center side of the reflection plate 11 as shown in FIGS. 10(a) and (b), and as shown in FIG. 12, light is asymmetrically reflected to both sides. Also, an accurate shape of such a projection 17a is determined by optically designing by means of a computer, etc., so that light is reflected to specified emission areas 14.

Figure 13:
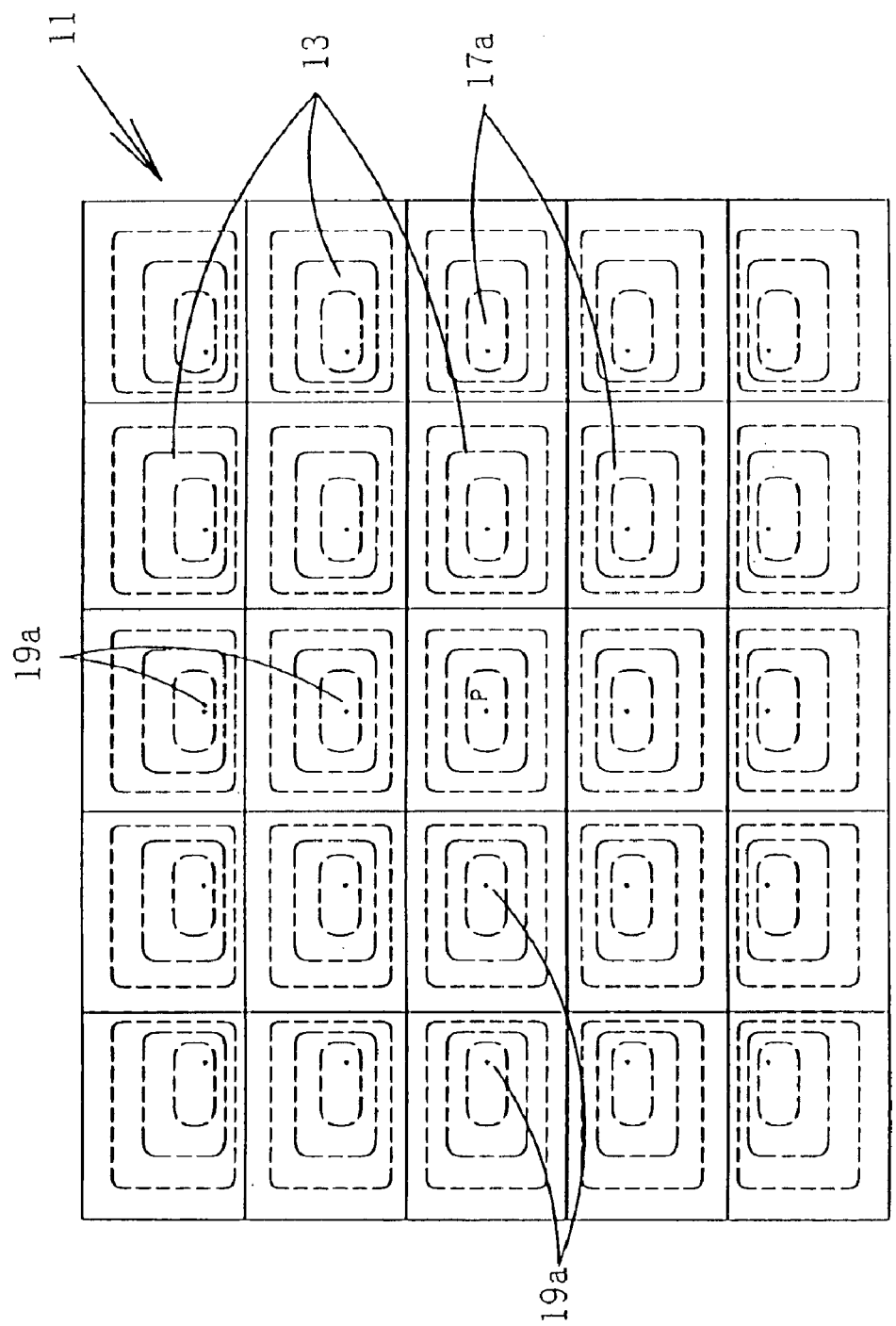
FIG. 13 is a plan view showing arrays of unit reflection areas composed of projections in the reflection plate.

As a result, judging from entire of the reflection plate, the positions of the tops 19a of the projections 17a in the respective unit reflection areas 13 slightly differ from each other in line with the unit reflection areas 13 parting from the center of the emission area 14 or the center P of the reflection plate 11 as shown in FIG. 13. In detail, the positions of the tops 19a of the projections 17a are gradually biased to the side approaching the canter of the emission area 14 or the center P of the reflection plate 11 from the center of the unit reflection areas 13 in line with parting from the center P of the reflection plate 11.

Further, unit reflection areas 13 may be composed of a plurality of recesses and projections. For example, the projection 17a may be divided into a plurality as shown in FIGS. 9(a) and (b), and in FIGS. 10(a) and (b).

Figure 14:
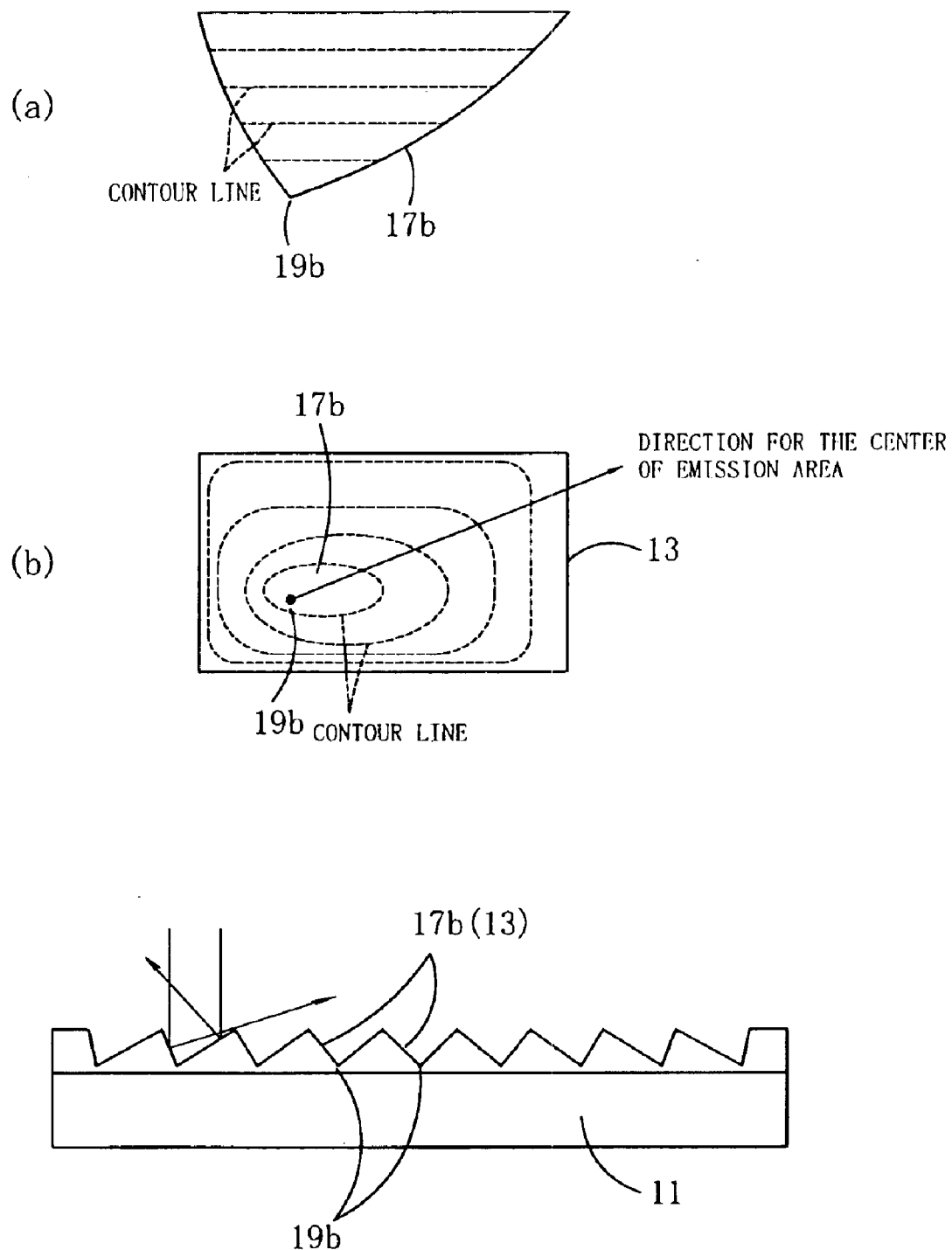
FIG. 14(a) is a view showing a cross-sectional shape of a unit reflection area composed of a recess.
FIG. 14(b) is a plane thereof.
FIG. 14(c) is a cross-sectional view showing a reflection plate on which unit reflection area composed of a recess are arrayed.

In addition, unit reflection areas 13 may be composed of recesses. As one example of the recess 17b, by locating the lowest point 19b of the recess 17b above an extension of a sent drawn from the center of the unit reflection area 13 to the center O of the emission area 14 so that the lowest point 19b is parted from the center of the reflection plate 11, almost no light reflected by the recess 17b is reflected to the front side of the reflection plate 11, but may be emitted to specified emission area 14. In detail, in the embodiment shown in FIG. 14, unit reflection areas 13 are composed of recesses 17b whose inner surface is curved, roughly conical or roughly pyramid-sed. The shape (or distribution of inclination angles) of the curved surface inclined between the lowest point 19b of the recess 17b and the four sides of the unit reflection areas 13 is designed corresponding to the target emission areas. The recess 17b does not have any plane (tangential plans) perpendicular to the incident light but is steep at the lowest point 19b. Therefore, almost no light reflected by the recess 17b is reflected to the front side (in the regular reflection direction) of the reflection plate 11.

In the reflection plane 11 that is composed by arraying unit reflection areas 13 consisting of such recesses 17b, in the unit reflection area 13 located at the center P of the unit reflection areas 13, the lowest point 19b of the recess 17b is located perpendicularly downward of the center P, wherein the recess 17b can reflect light in both directions at the same amount. To the contrary, in the unit reflection areas 13 located apart from the center P of the reflection plate 11, the lowest point 19b of the recess 17b is located above an extension of a segment drawn from the center of the mission area 14 to the center of the unit reflection area 13, wherein as shown in FIGS. 14(a) and (b), the lowest point 19b of the recess 17b is biased in the direction far from the center of the emission area 14 or the center of the reflection plate 11. As a result, in such a reflection plate 11, the positions of the lowest points 19b of the recesses 17b in the respective unit reflection areas 13 gradually differ from each other in line with the unit reflection areas 13 parting from the center of the emission area 14 or the center P of the reflection plate 11. As shown in FIG. 14(c), the positions of the lowest points 19b of the recesses 17b are gradually biased from the center of the unit reflection areas 13 to the center of the emission areas 14 or from the center P of the reflection plate 11 to directions parting therefrom in line with the unit reflection areas 13 parting from the center P of the reflection plate 11.

FIG. 15 through FIGS. 20(a), (b) and (c) show relationships between the emission areas 14 and the shining areas 15 while showing the shapes of the projections 17a corresponding thereto. FIG. 15 shows a case of designing in which the boundary at the inner circumferential side of the emission area 14 becomes a circle that int lly almost touches the outer edge of the shining area 15. Where it is assumed that the outer edge of the emission area 14 on a specified plane is elliptical., radius of the major axis is "a", radius of the minor axis is "b", length of the longer sides of the shining area 15 is "w1", length of the shorter sides thereof is "w2", the original point of the x-y coordinate is placed at the center O of the emission area 14, x axis is defined to be parallel to the major axis direction of the emission area 14 and y axis is defined to be parallel to the minor axis thereof (the assumption is the same hereinafter), the emission area 14 is expressed by the following expressions (1) and (2). As shown in FIGS. 16(a), (b) and (c), the unit reflection area 13 becomes a square in order to achieve the above, and the projection 17a becomes roughly conical.

$$\frac{x^2}{\left(\frac{w2}{2}\right)^2} + \frac{y^2}{\left(\frac{w2}{2}\right)^2} > 1 \tag{1}$$

$$\frac{x^2}{a^2} + \frac{y^2}{b^2} < 1 \tag{2}$$

Figure 17:
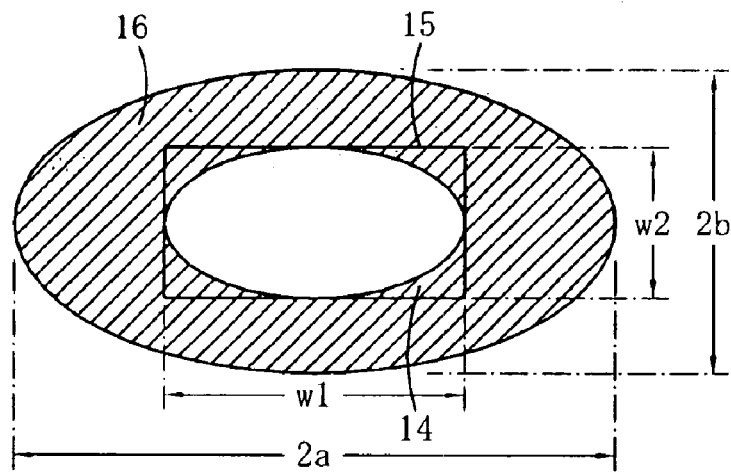
FIG. 17 is a view showing another relationship between the emission area and the shining area.
Figure 18:
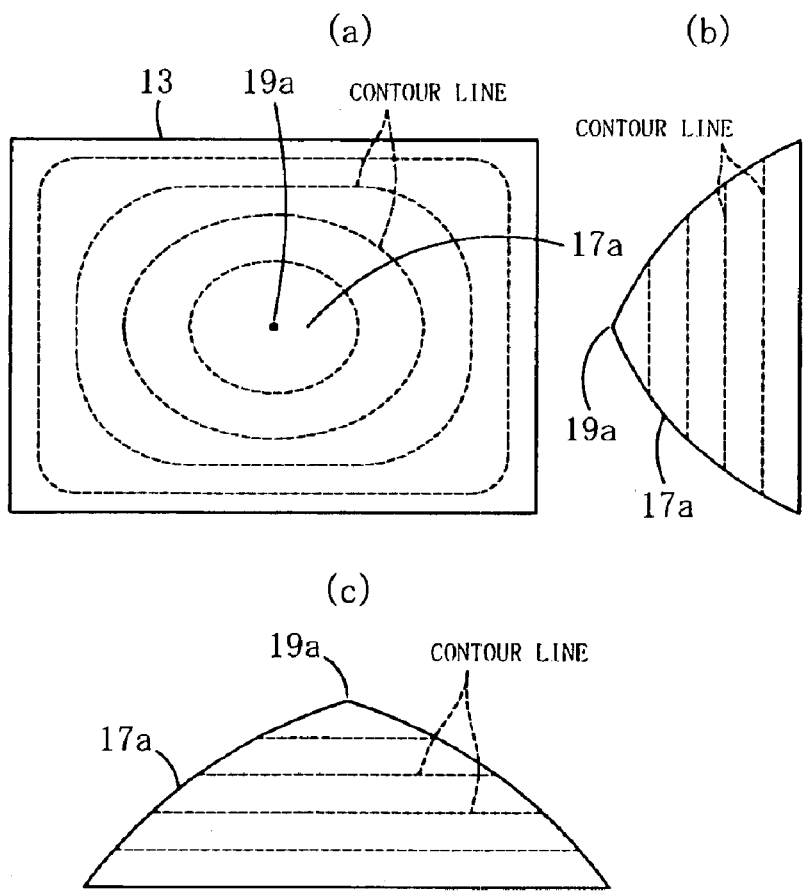
FIGS. 18(a), (b) and (c) are, respectively, a plan view, a side elevational view, and a front elevational view showing the shape of a projection to obtain light distribution as in FIG. 17.

FIG. 17 shows a case of designing the boundary at the inner circumferential side of the emission area 14 so that it becomes an ellipse that internally almost touches the outer edge of the shining area 15, and the emission area 14 is expressed by the following expressions (3) and (4). As shown in FIGS. 18(a), (b) and (c), the unit reflection area 13 to achieve the above becomes a rectangle, wherein the projection 17a becomes roughly elliptically conical.

$$\frac{x^2}{\left(\frac{w1}{2}\right)^2} + \frac{y^2}{\left(\frac{w2}{2}\right)^2} > 1 \tag{3}$$

$$\frac{x^2}{a^2} + \frac{y^2}{b^2} < 1 \tag{4}$$

Figure 19:
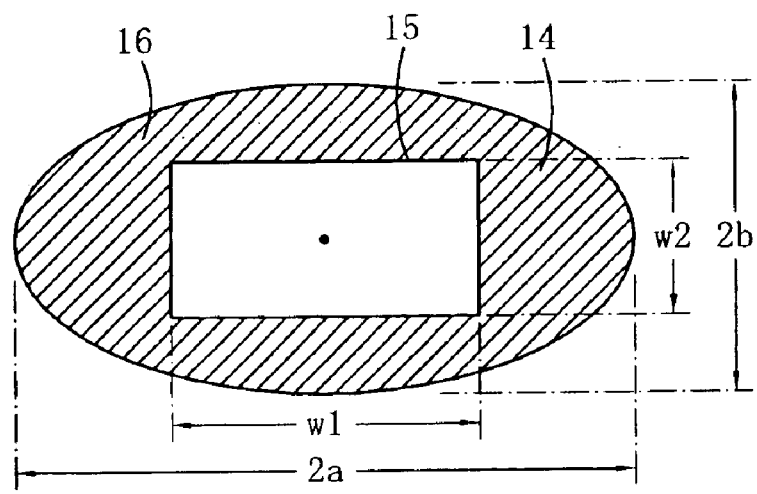
FIG. 19 is a view showing still another relationship between the emission area and the shining area.
Figure 20:
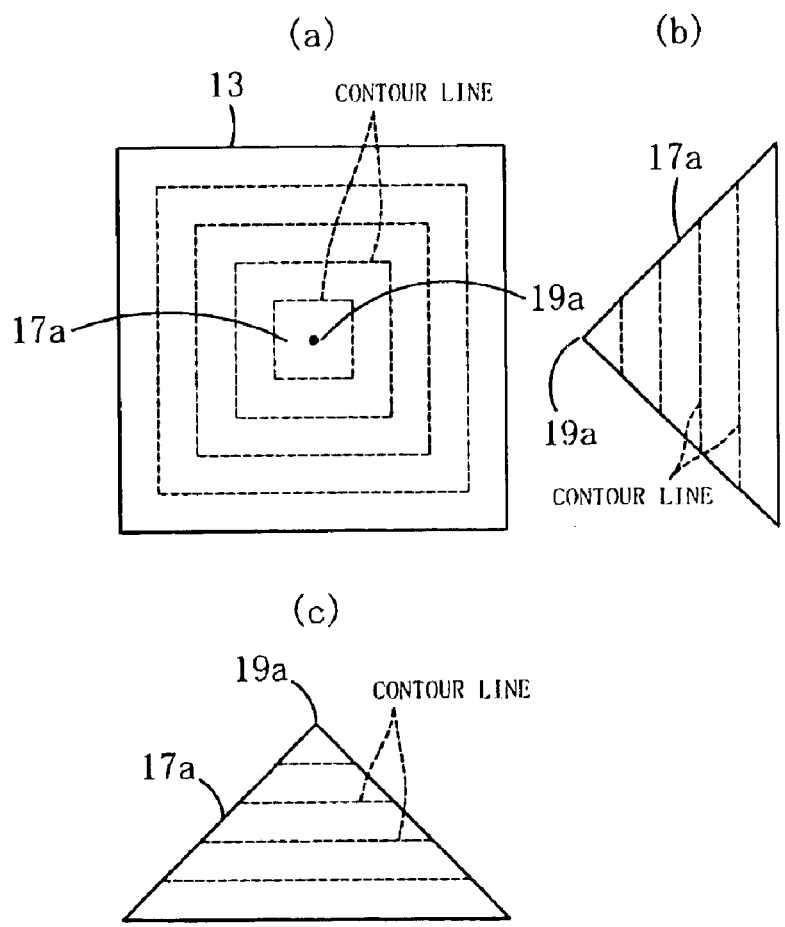
FIGS. 20(a), (b) and (c) are, respectively, a plan view, a side elevational view, and a front elevational view showing the shape of a projection to obtain light distribution as in FIG. 19.

FIG. 19 shows a case of designing the boundary at the inner circumferential side of the emission area 14 so that it becomes a rectangle that is almost coincident with the outer edge of the shining area 15, and the emission area 14 is expressed by the following expressions (5), (6) and (7). As shown in FIGS. 20(a), (b) and (c), the unit reflection area 13 to achieve the above becomes a rectangular area, and the projection 17a becomes roughly pyramid-conical.

$$\left|x - \frac{w1}{2}\right| > 0 \tag{5}$$

$$\left|y - \frac{w2}{2}\right| > 0 \tag{6}$$

$$\frac{x^2}{a^2} + \frac{y^2}{b^2} < 1 \tag{7}$$

Where peripheral light is made perpendicularly incident into the liquid crystal panel 18, the shining area 15 becomes the entire front side of the liquid crystal panel 18. However, the slighter the overlapping portion of the emission area 14 and the shining area 15 becomes, the less the emission of light outside the effective field of vision area becomes, wherein light utilization efficiency can be improved, and the screen can be made brighter. However, it is easier for such roughly conical projections 17a as shown in FIGS. 16(a), (b) and (c) to be produced. Therefore, it is preferable that the overlapping portion of the emission area 14 and the shining area 15 is made as slight as possible while taking the difficulty in designing and producing the projections 17a (or recesses 7b) and production costs thereof into consideration.

However, the most preferable structure is such that the omission area 14 and the shining area 15 do not overlap each other completely as shown in FIG. 19. In unit reflection areas thus designed, it is difficult to completely make the overlapping thereof into zero in view of production accuracy of the projections 17a. Also, in fact, when taking mass production of the reflection plates 11 into consideration, 30% or less of the entire reflection light brought about by the reflection plate 11 must be allowed to be emitted inwardly of the emission area 14 (or into the shining area 15) in view of design. In addition, 10% or so of the reflection light must be allowed to leak outside the emission area 14. As a result, the amount of light emitted to the emission areas 14 or the effective field of vision area 16 in view of design becomes 50 through 60% of the entire amount of reflection light reflected by the reflection plate 11. However, in comparison with cases in which prior art reflection plates are employed, the brightness (display light) of the screen can be doubled. As a matter of course, it is needless to say that the amount of light emitted to the emission area 14 or the effective field of vision area 16 is devised to become 70% or more of the entire amount of reflection light, which is brought about by the reflection plate 11, in view of design.

Figure 21:
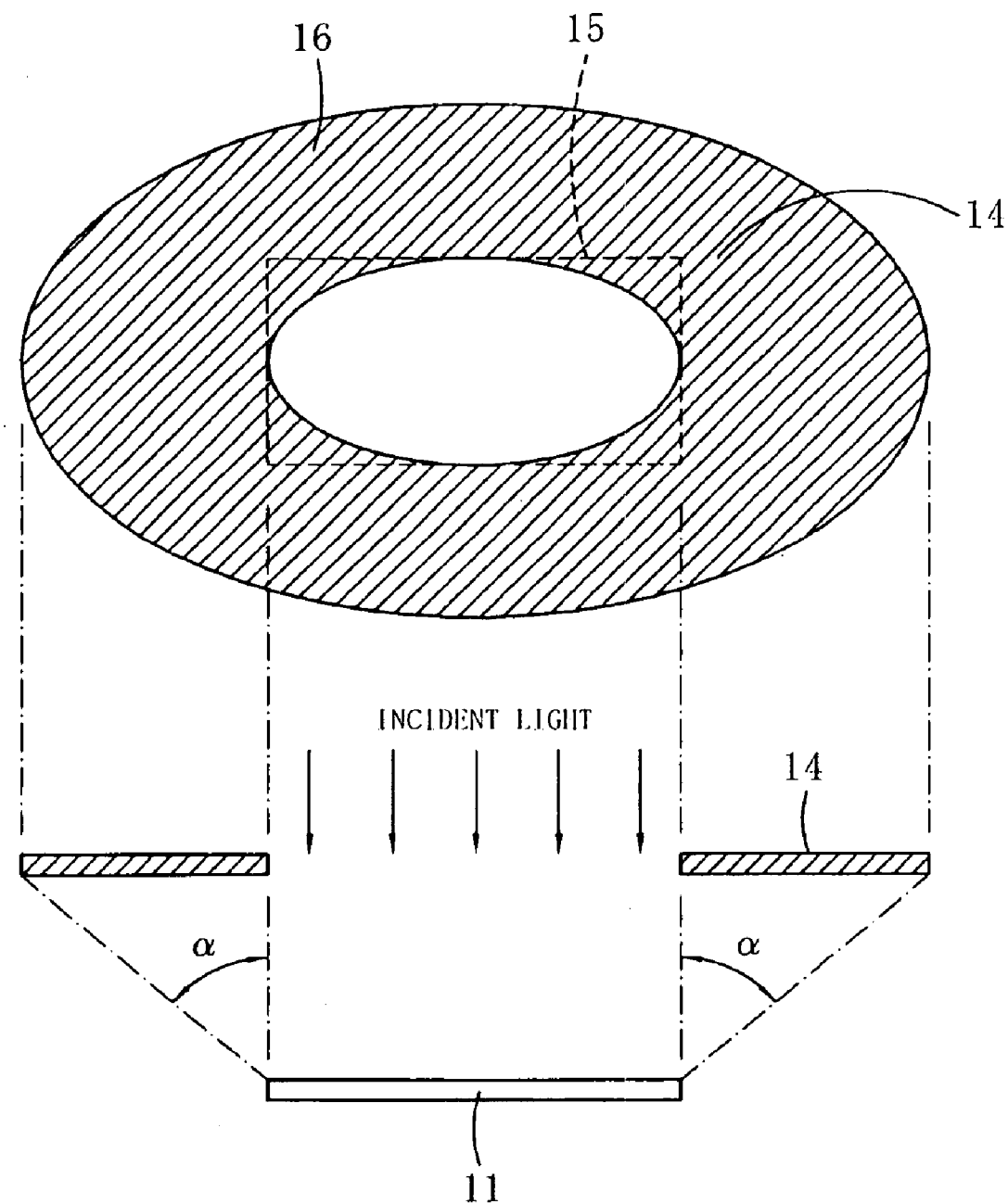
FIG. 21 is a view describing a clue to determine the size of an emission area.

Also, in a display device, an angle formed by a perpendicular line of work surface and the sight line is generally 20° through 30°, and is 60° at maxi. Accordingly, as regards the display screen of an image, a field of vision exceeding 60° is not required with respect to the perpendicular line of the display screen, wherein it is preferable that a spread angle α of the emission area 14, which is brought about by the reflection plate 11, shown in FIG. 21 is a≦60°.

Figure 22:
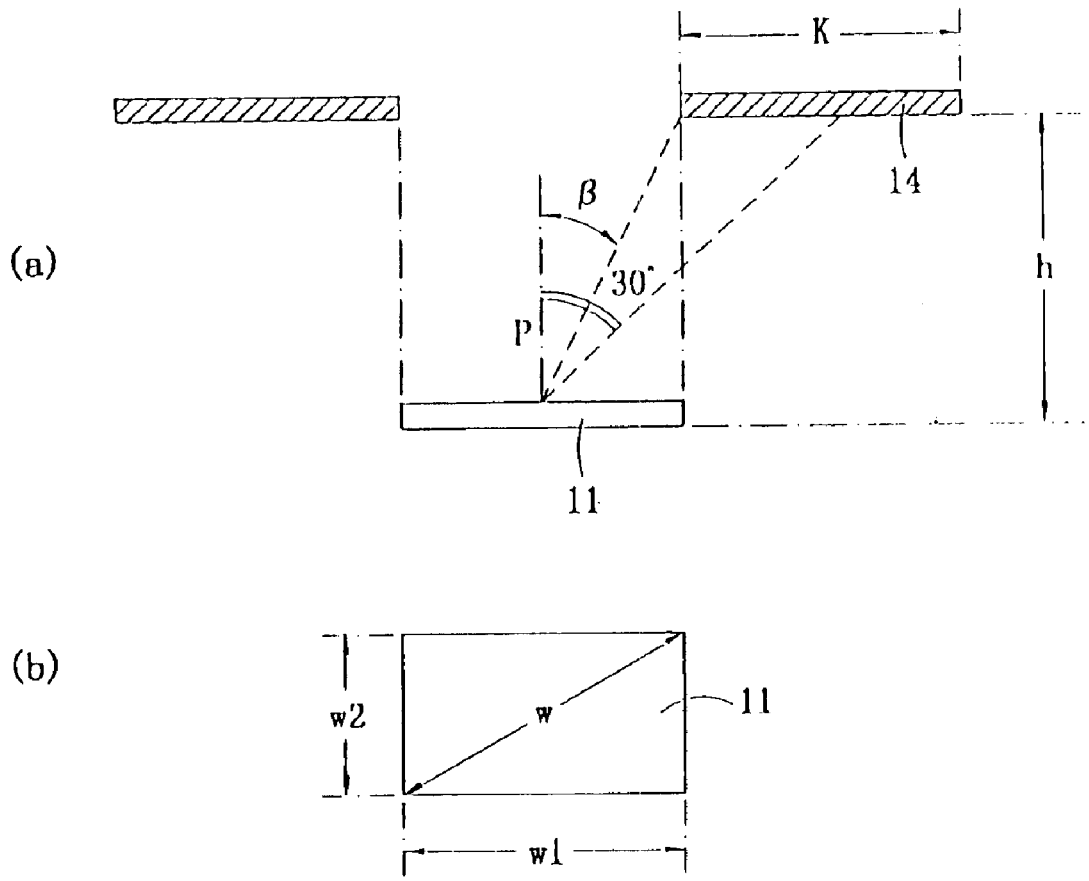
FIG. 22(a) is a view describing another clue to determine the size of an emission area.
FIG. 22(b) is a view showing dimensions of a reflection plate.

In particular, a direction of a general point of vision of an observer is an inclination angle of 30° from the normal line of a display screen. Also, almost all points of an observer's vision are concentrated in an area of approximately 30°±15°. Therefore, it is preferable that the spread angle of the emission area 14 when being observed from the reflection plate 11 is approximately 15° through 45°. In order to design such an emission area 14, a perpendicular distance h to the emission area 14 is defined by the following expression (9) by using a length w in the diagonal direction, which is defined by the following expression (8) and is shown in FIG. 22(b), acting as the average of the length w1 in the major axis direction of the reflection plate 11 and the length w2 of the minor axis direction thereof, so that an angle β=15° of a segment form the center of the reflection plate 11 toward the inner edge of the emission area 14 is as shown in FIG. 22(a). And, where it is assumed that a width of the emission area 14 is K, expressions (10) and (11), which express the emission area 14, are obtained by applying the above-described expressions (3) and (4) thereto. And, it is devised that 70% or more of the reflection light brought about by the reflection plate 11 is caused to reach this area. For example, according to the results of simulation of the amount of emission light, which has been carried out on the basis of data obtained by producing a foursquare reflection plate whose each side is 10 cm long and measuring the shape thereof by a profiler, a ring-shaped emission area whose outer radius is 15 cm and inner radius 5 cm is established at a perpendicular distance h, which is 30 cm apart from the reflection plate, and an amount of light emitting to the mission area is measured. In this case, it was possible to obtain an amount of emission light of 76% with respect to the amount of light incident into the reflection plate.

$$w = \sqrt{(w1)^2 + (w2)^2} \quad (8)$$

$$h = \left(\frac{w}{2}\right)\cot\beta \quad (9)$$

$$\frac{x^2}{\left(\frac{w1}{2}\right)^2} + \frac{y^2}{\left(\frac{w2}{2}\right)^2} > 1 \quad (10)$$

$$\frac{x^2}{\left(K + \frac{w1}{2}\right)^2} + \frac{y^2}{\left(K + \frac{w2}{2}\right)^2} < 1 \quad (11)$$

Also, it is not necessary that the emission area 14 exists on the entire circumference outside the shining area 15. As shown in FIG. 23(a), the emission area 14 may be established at only the left and right parts of the shining area 15 and downward thereof in compliance with uses and use environments. As shown in FIG. 23(b), the emission area 14 may be established only on and below the shining area 15, and as shown in FIG. 23(c), the emission area 14 may be established only below the shining area 15. Of course, the emission area 14 maybe otherwise established. According to such constructions, light emitted from the screen to unnecessary directions can be reduced in response to a use method of an apparatus in which a reflection type liquid crystal display device is equipped, and the amount of light emitting in necessary directions can be accordingly increased, wherein it becomes possible to improve the brightness of the screen.

Figure 24:
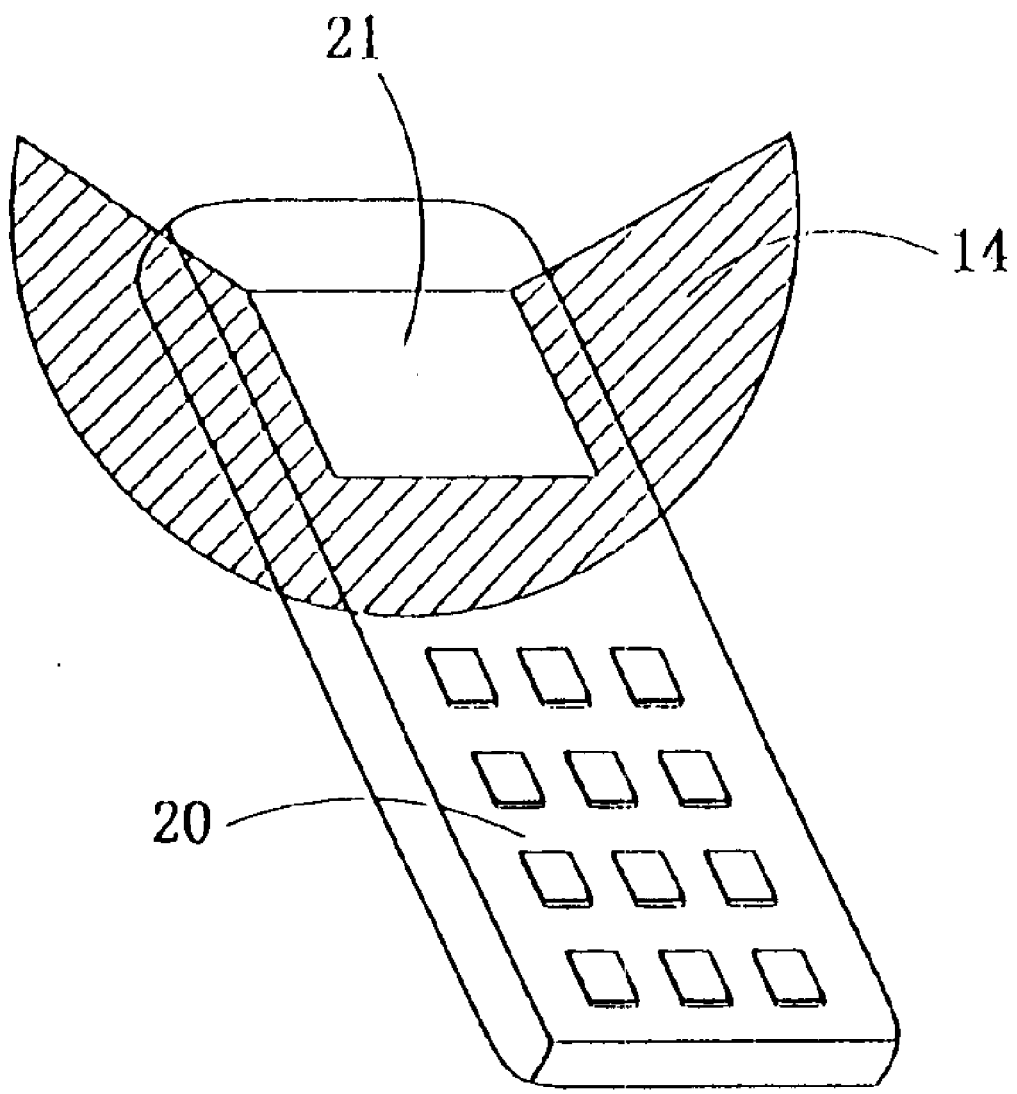
FIG. 24 is a view describing a use example, in which the emission area does not cover the entire circumference.

For example, in the case of a mobile telephone 20 shown in FIG. 24, the display screen 21 is observed with the telephone 20 held by hand and inclined to some degrees. In such a case, since light reflected upward of the display screen 21 is useless, upward reflection of the light is suppressed as shown in FIG. 24, and light to be oriented upward is emitted to the left and right sides and downward of the screen, wherein it is possible to achieve a brighter display screen 21.

Figure 25:
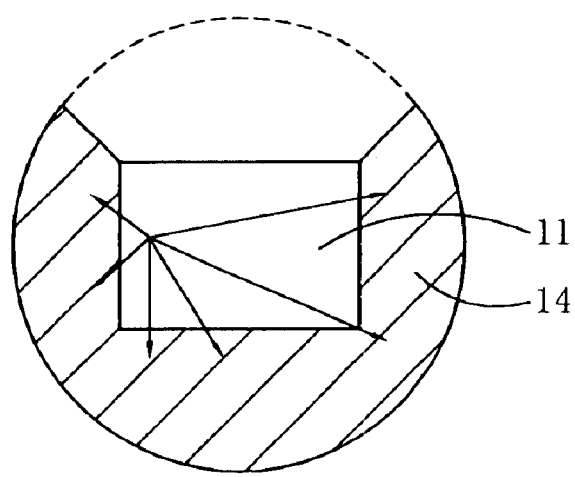
FIG. 25 is a view showing the emission areas located at the left and right sides of the reflection plate and the lower part thereof.
Figure 26:
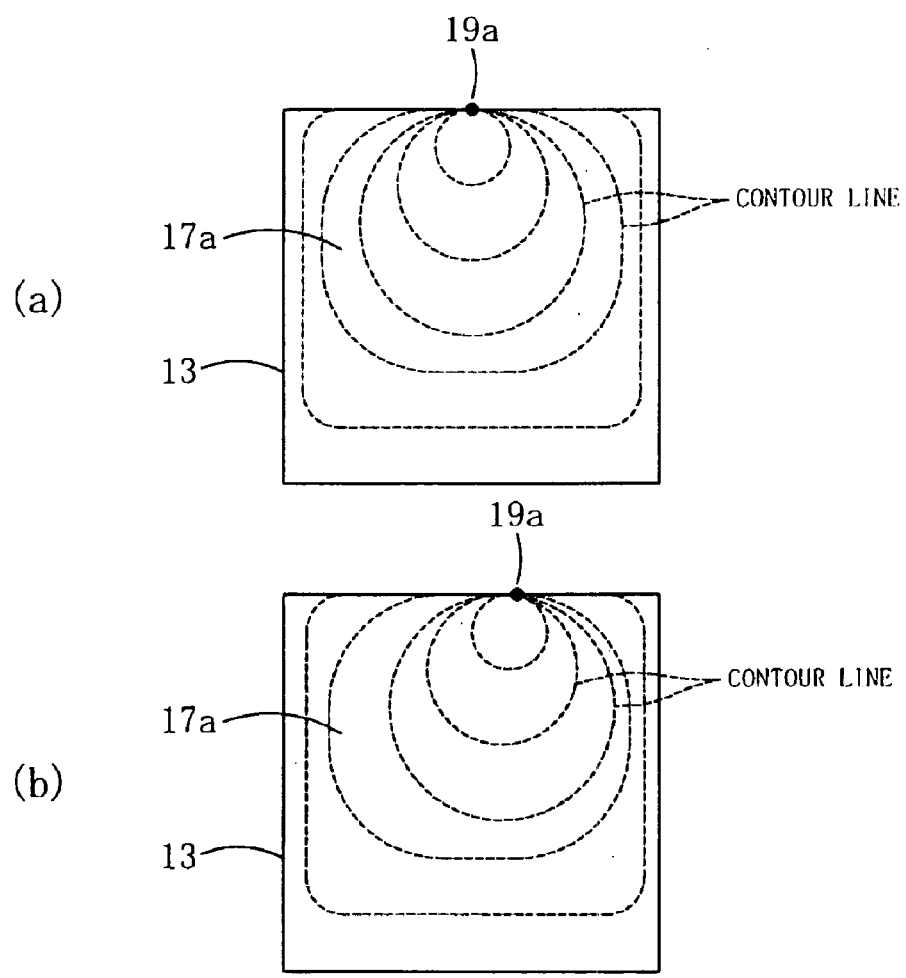
FIGS. 26(a) and (b)-are plan views each showing the shapes of projections of unit reflection areas to obtain emission areas as shown in FIG. 23.

FIGS. 26(a) and (b) express the shape of a projection 17a to emit light from the reflection plate 11 to the left and right sides and downward of the screen as shown in FIG. 25. FIG. 26(a) shows a projection 17a at the middle of the reflection plate 11. The projection 17a does not emit light upward while it has a symmetrical shape at the left and right sides. That is, the upward side is, composed to be perpendicular or of a steeply inclined side. FIG. 26(b) shows a projection 17a of a unit reflection area 13 which emits light in FIG. 25, wherein the top 19a is displaced to the center side of the reflection plate 11 (right side in the drawing).

Figure 27:
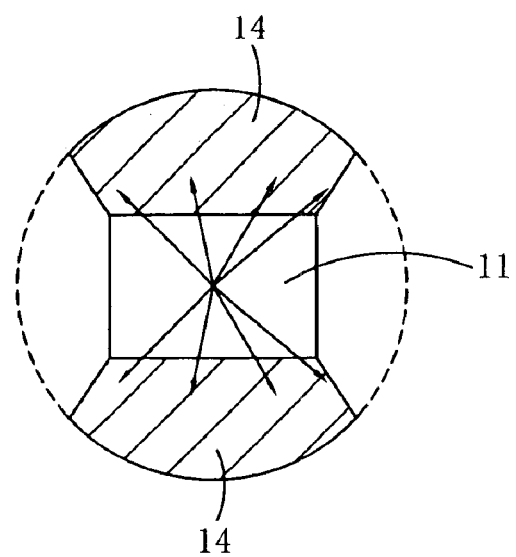
FIG. 27 is a view showing the emission areas located at the upper part of the reflection plate and at the lower part thereof.
Figure 28:
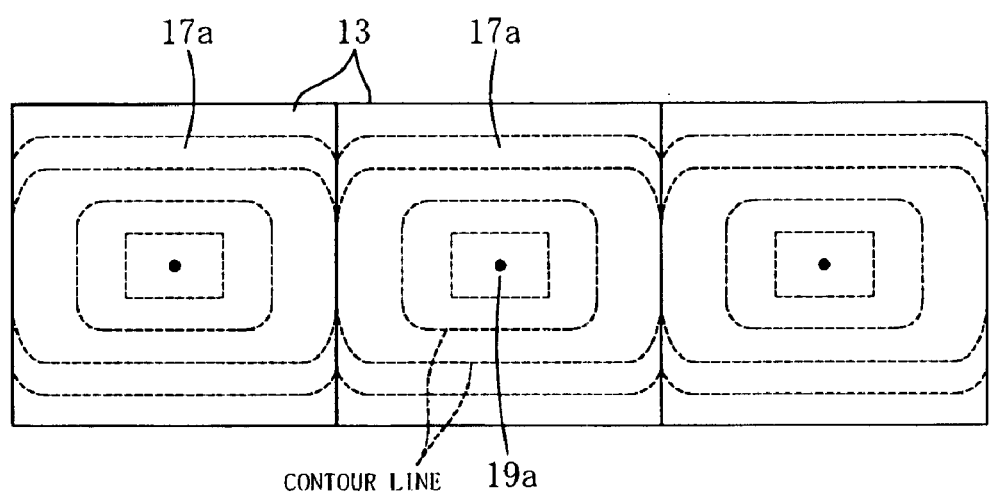
FIG. 28 is a plan view showing the shape of a projection of a unit reflection area to obtain the emission area shown in FIG. 27.

FIG. 28 expresses a shape of the projection 17a to emit light from the reflection plate 11 upward and downward as shown in FIG. 27. FIG. 28 indicates the projection 17a at the middle part of the reflection plate 11. That is, the projection 17a has a gentle slope in the left and right directions and hardly reflects light in the left and right directions while the projection 17a reflects light upward and downward with a large slope at the upper and lower sides.

Figure 29:
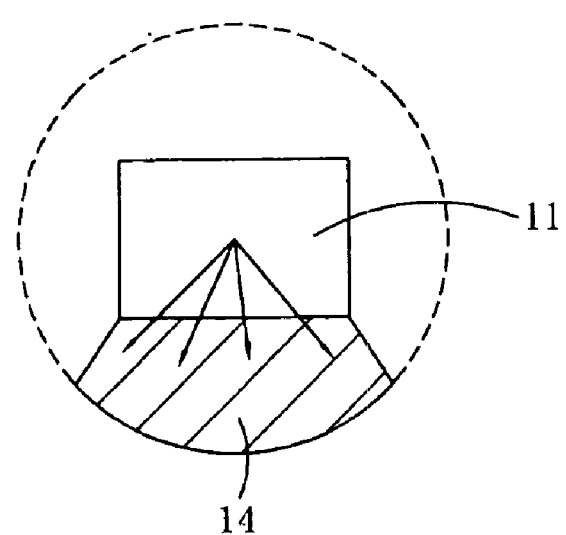
FIG. 29 is a view showing the emission area located at the lower part of the reflection plate.
Figure 30:
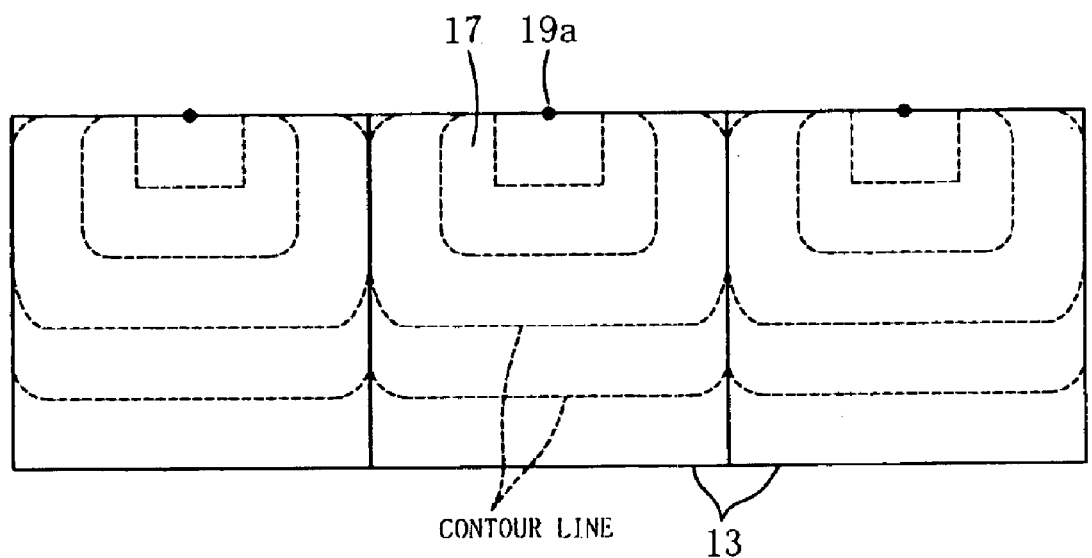
FIG. 30 is a plan view showing the shape of a projection of a unit reflection area to obtain the emission area shown in FIG. 29.

FIG. 30 shows the shape of the projection 17a for emitting light only downward from the reflection plate 11 as shown in FIG. 29. FIG. 30 indicates the projection 17a at the middle of the reflection plate 11, which reflects light downward at a large inclination at downward sides. However, the projection 17a hardly reflects light to the left and right directions because the slope in the left and right directions is gentle. In addition, the top 19a thereof is biased upward, the projection 17a hardly reflects light upward. In such a structure, since light can be collected downward, an operation panel is lighted where the operation panel is provided downward of the display surface.

Figure 31:
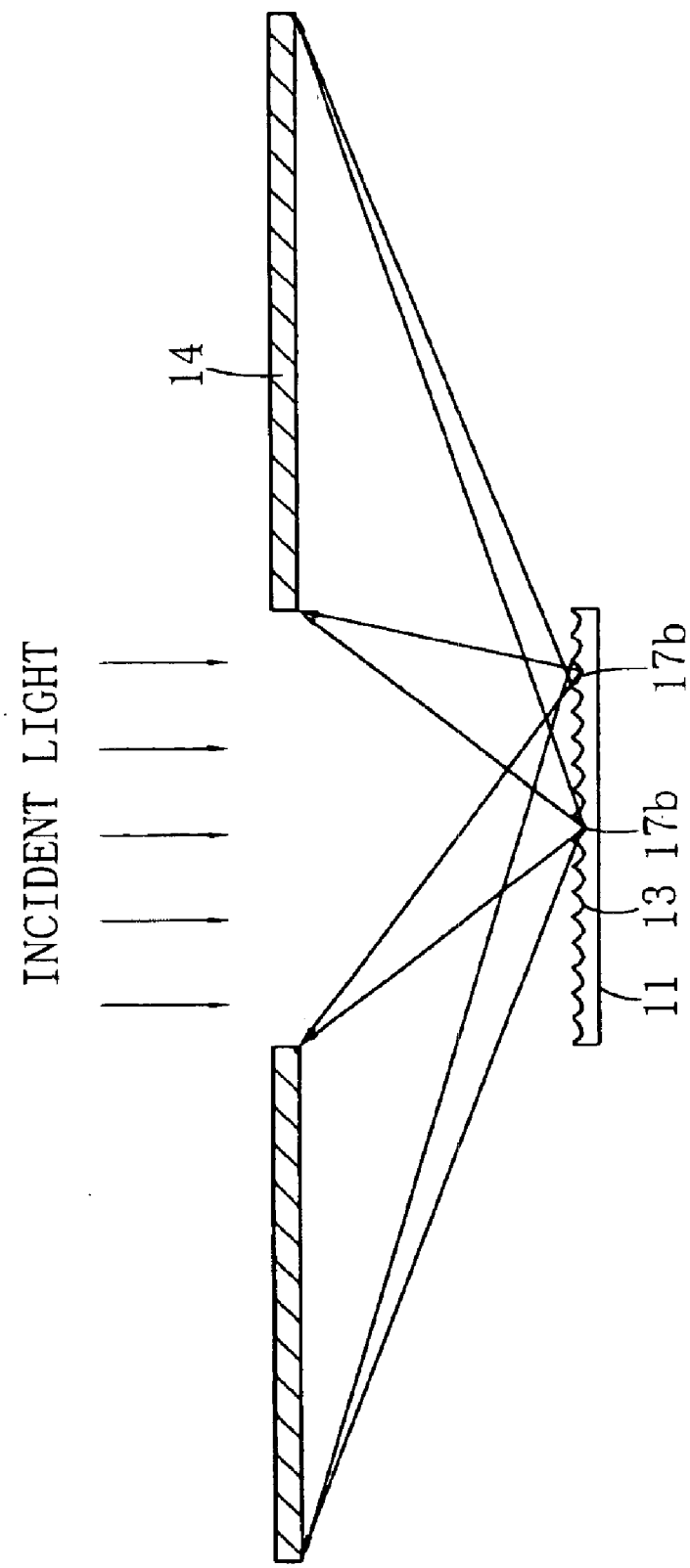
FIG. 31 is a general view showing a reflection plate according to another embodiment of the invention and the actions thereof.

Next, a description is given of unit reflection areas 13 having another structure. This embodiment is designed, as shown in FIG. 31, so that unit reflection areas 13 are, respectively, composed of a single recess 17b, and light incident into the recess 17b of the respective unit reflection areas 13 is reflected by the recesses 17b, wherein the reflected light is emitted to a specified emission area 14 at a specified plane.

FIG. 32(a) is a view describing a method for designing such a recess 17b, FIG. 32(b) is an enlarged view of X portion thereof. Where a one-side half from the lowest point 19b of the section of the recess 17b is taken into consideration, an angle of the edge of the recess 17b is determined so that light L2 reflected by the edge reaches the outer edge of a one-side half of the emission area 14. Also, an angle in the vicinity of the lowest point 19b of the recess 17b is determined so that light L1 reflected in the vicinity of the lowest point 19b of the recess 17b reaches the inner edge of the one-side half of the emission area 14, and an inclination from an end at one side of the recess 17b to the lowest point 19b is determined so that light is uniformly reflected in the width direction of the emission area 14. As in the above, the other inclination of the recess 17b is determined so that the light reflected by the other half of the recess 17*b* reaches the other emission area 14. By thus determining the inclination of the recess 17*b* at the entire circumference, the shape of the recess 17*b* is determined.

Figure 33:
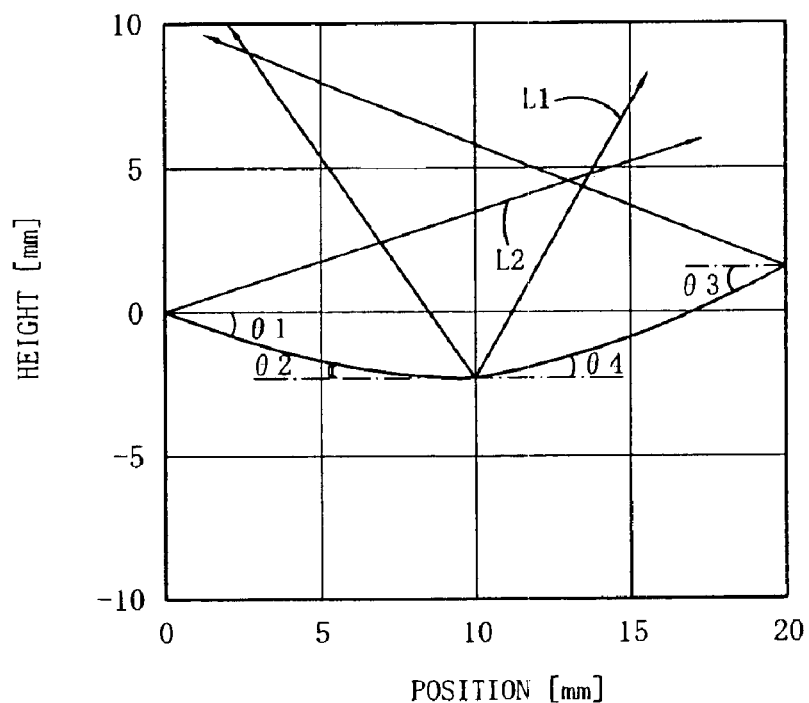
FIG. 33 is a view describing a different method for designing the reflection plate shown in FIG. 31.
Figure 34:
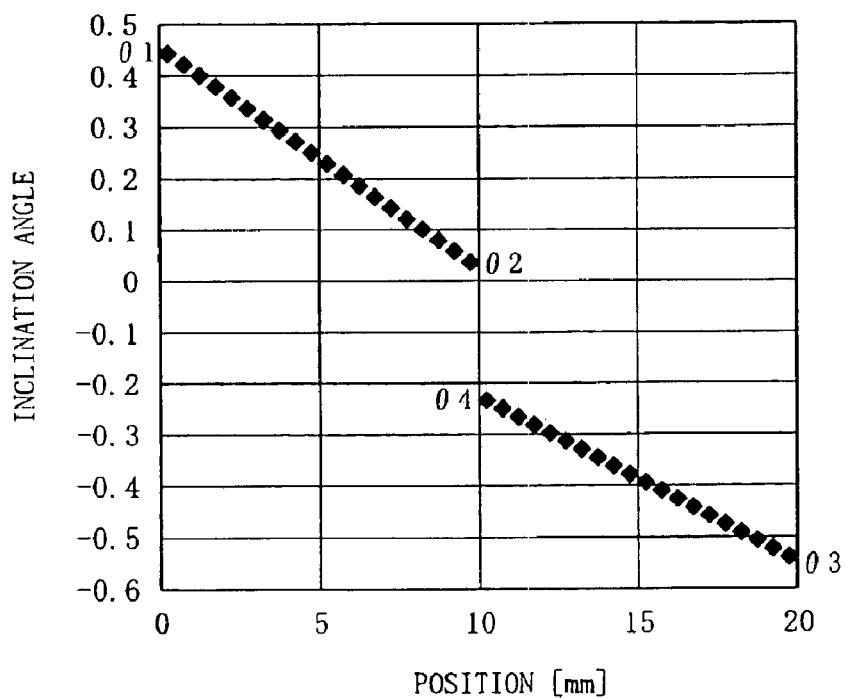
FIG. 34 is a view showing a method for determining distribution of inclination angles of recesses on the basis of FIG. 33.

FIG. 33 and FIG. 34 simplify the above-described method. As shown in FIG. 33, an angle θ1 of the edge of the recess 17*b* is determined so that the light 12 reflected by the edge at one-side half of the recess 17*b* reaches the outer edge of one-side half of the emission area 14, and another angle θ2 in the vicinity of the lowest point 19*b* of the recess 17*b* is determined so that the light L1 reflected in the vicinity of the lowest point 19*b* of the recess 17*b* reaches the inner edge of one-side half of the emission area 14. After that, intermediate angles are determined by linearly connecting both angles θ1 and θ2 as shown in FIG. 34. As in the above, the other shape of the recess 17*b* is determined by linearly varying the angle after determining the angle θ3 at the other half and the angle θ4 in the vicinity of the lowest point 19*b*. The sectional shape of the recess 17*b* thus determined can be expressed with two parabolas.

Figure 35:
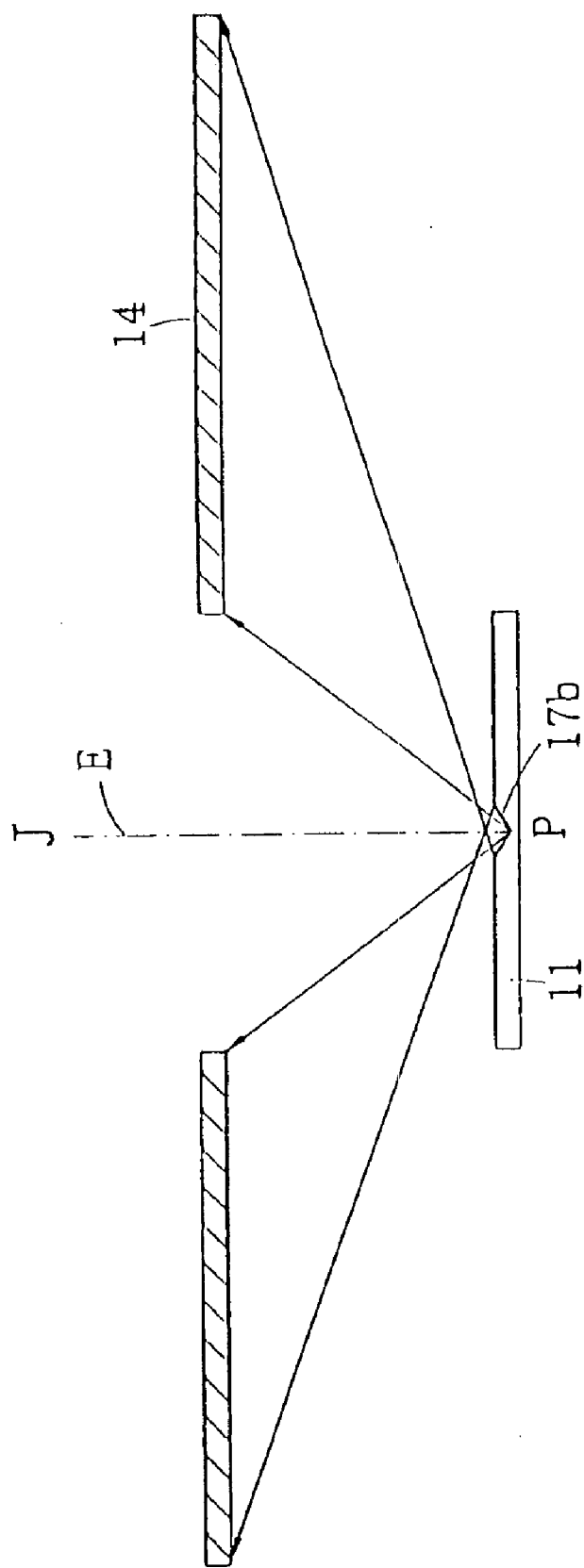
FIG. 35 is a view showing a further different method for designing the reflection plate shown in FIG. 31.
Figure 36:
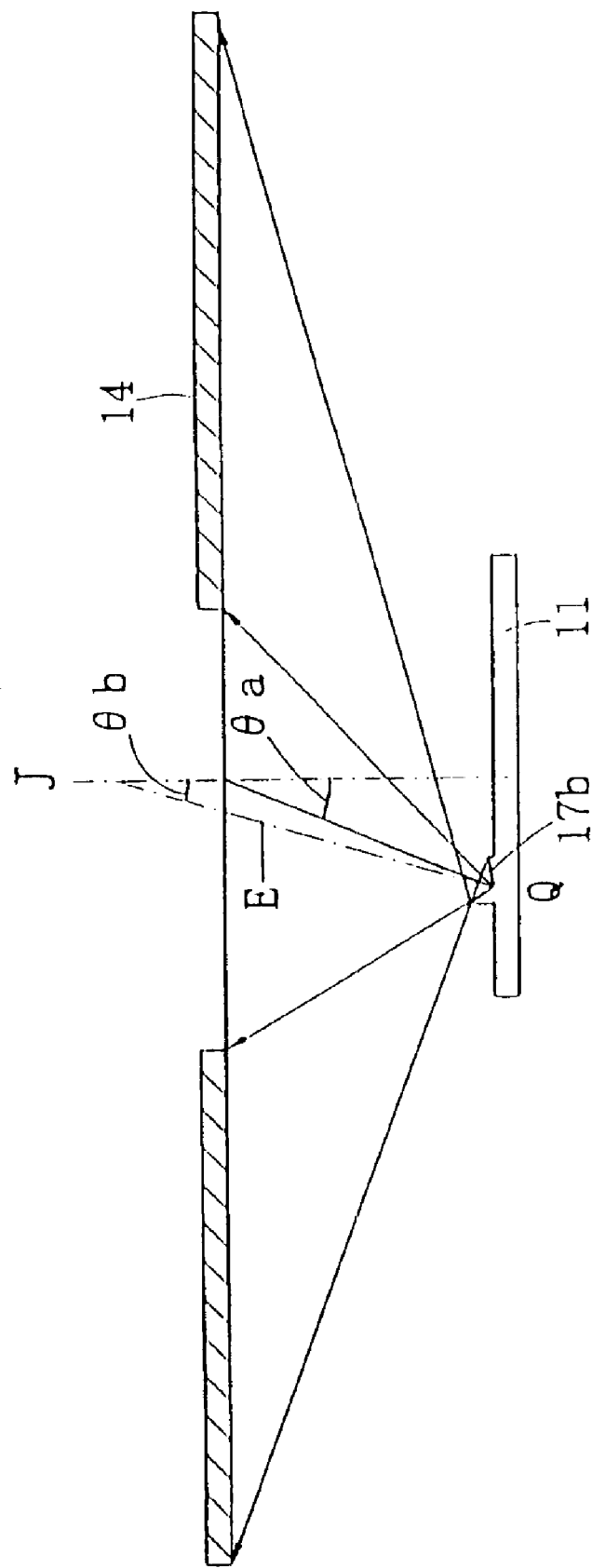
FIG. 36 is a view showing a method for determining the inclinations of recesses located apart from the center in the designing method shown in FIG. 33.
Figure 37:
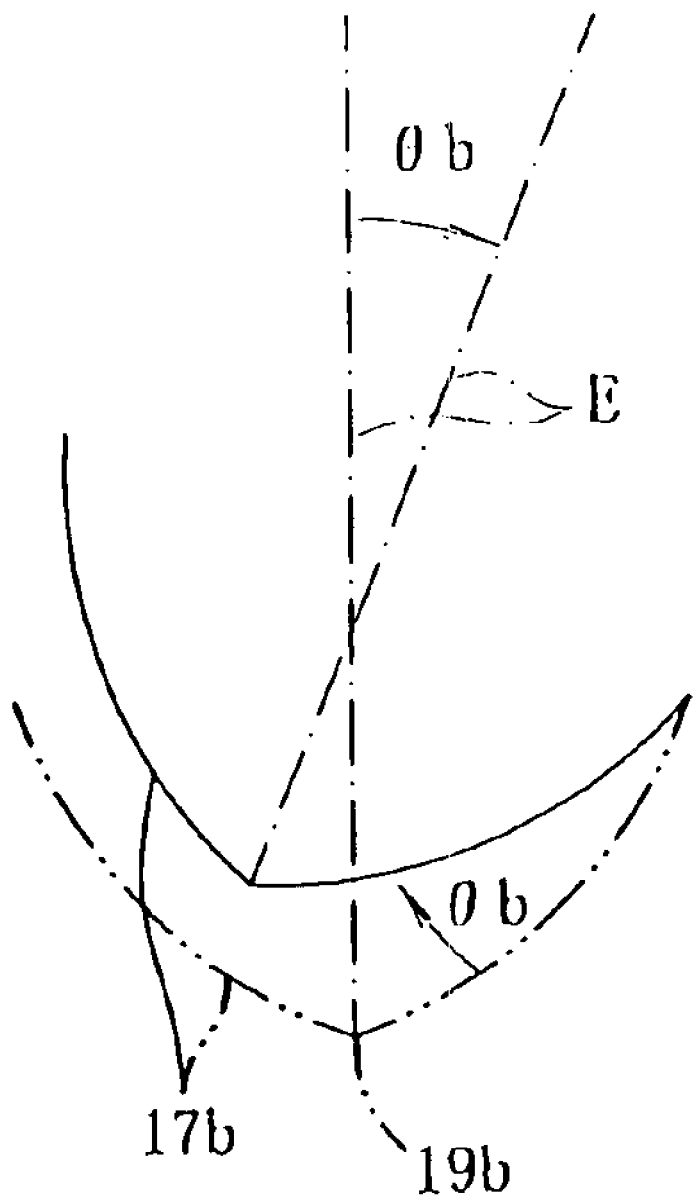
FIG. 37 is a detailed view describing FIG. 36.

FIG. 35, FIG. 36 and FIG. 37 show different methods for designing the recess 17*b*. The emission area 14 becomes roughly like an elliptical ring or roughly like a circular ring as described above. Where a perpendicular line J erected on the reflection plate 11 passing through the center of the emission area 14 is taken into consideration, first, the shape of the recess 17*b* at the center P of the reflection plate 11 is determined so that light reflected by the recess 17*b* located at the center P of the reflection plate 11 is emitted to the emission area 14 as shown in FIG. 35 (by, for example, such a method as shown in FIGS. 32(*a*) and (*b*)). Further, where the recess 17*b* at position Q apart from the center P is determined, if an angle targeting the corresponding position Q from the center O of the emission area 14 is θa, as shown in FIG. 36, the shape of the recess 17 becomes the same as that of the recess 17*b* at the center P, wherein the recess 17*b* is obliquely disposed so that an angle formed by an axial center E of the recess 17*b* and the perpendicular line J of the reflection plate 11 becomes θb=θa/2 on the plane including the perpendicular line J erected on the center of the reflection plate 11 and the axial center E of the recess 17*b*. That is, as shown in FIG. 37, the recess 17*b* having the same shape as that of the recess 17*b* at the center P is disposed to be inclined at angle θb. The recesses 17*b* having the same shape are, thus formed at the entire circumference of the reflection plate 11, and the recesses 17*b* are inclined in response to the positions of installation of the respective recesses 17*b*, wherein it is possible to collect light reflected by the respective recesses 17*b* at the emission area 14.

Also, the axial center E with respect to one recess 17*b* apart from the center P is determined, an intersection point of, a perpendicular line J erected on the center of the reflection plate 11 and the axial center E is obtained, and with respect to the other recesses 17*b*, the inclination of the recesses 17*b* may be determined so that respective axial centers E pass through the intersection, whereby the axial centers E of all recesses 17*b* are crossed at one point.

Figure 38:
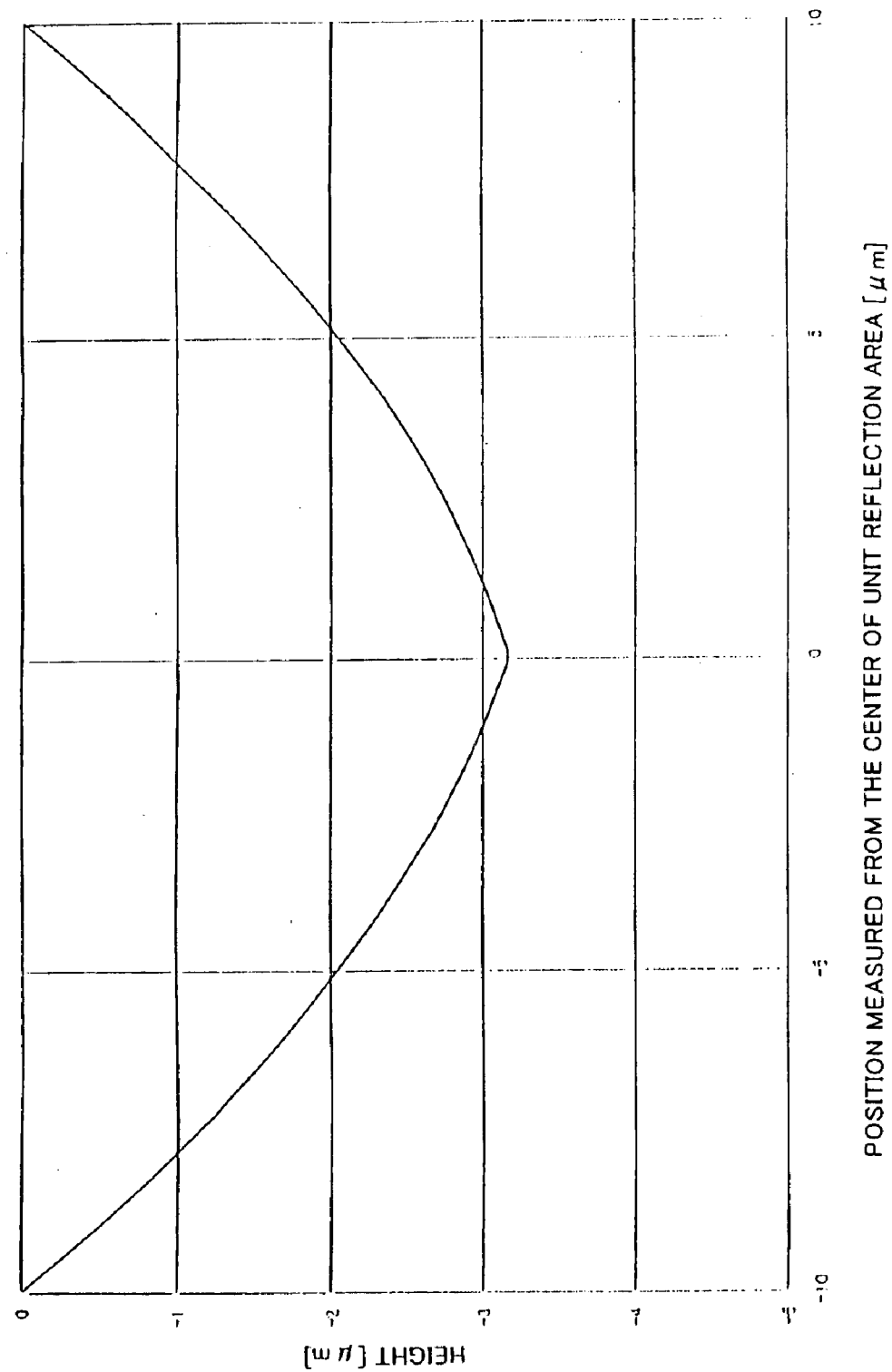
FIG. 38 is a view showing a detailed designing example of recesses, which shows the recess at the middle.
Figure 39:
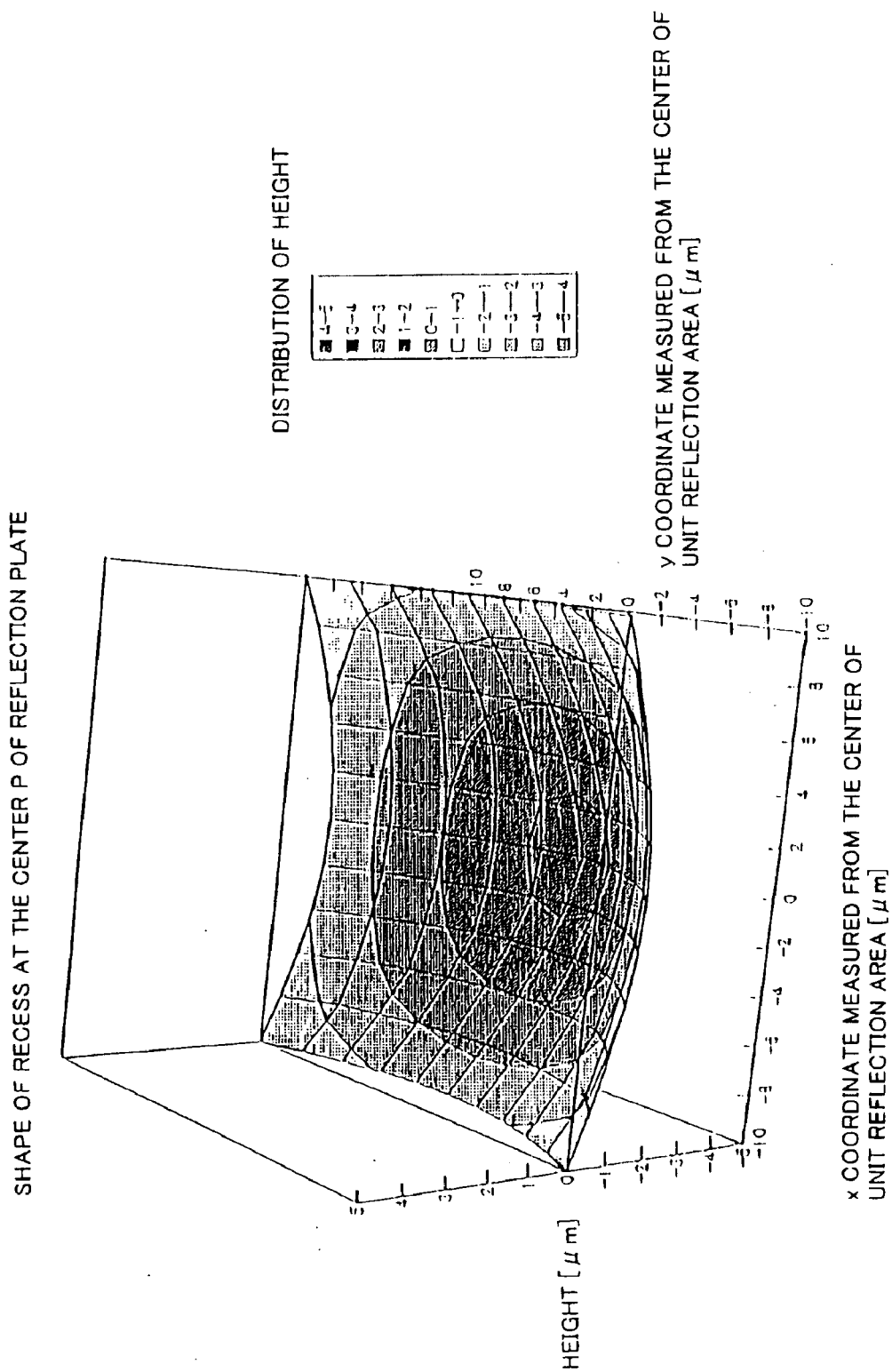
FIG. 39 is a perspective view showing the recess shown in FIG. 38 by discriminating the same with gradations on the basis of heights thereof.
Figure 40:
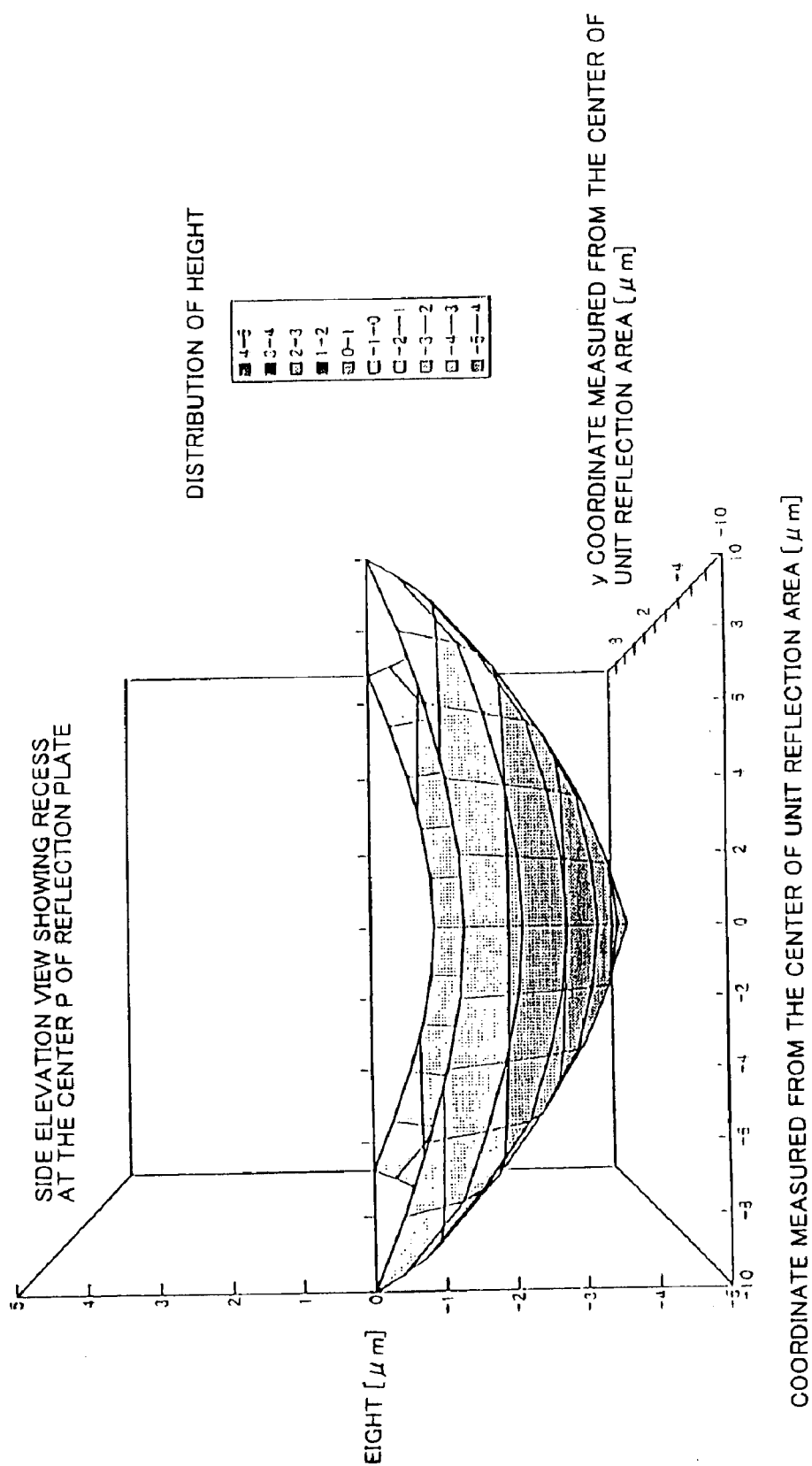
FIG. 40 is a side elevational view showing the recess shown in FIG. 38 by discriminating the same with gradations on the basis of heights thereof.
Figure 42:
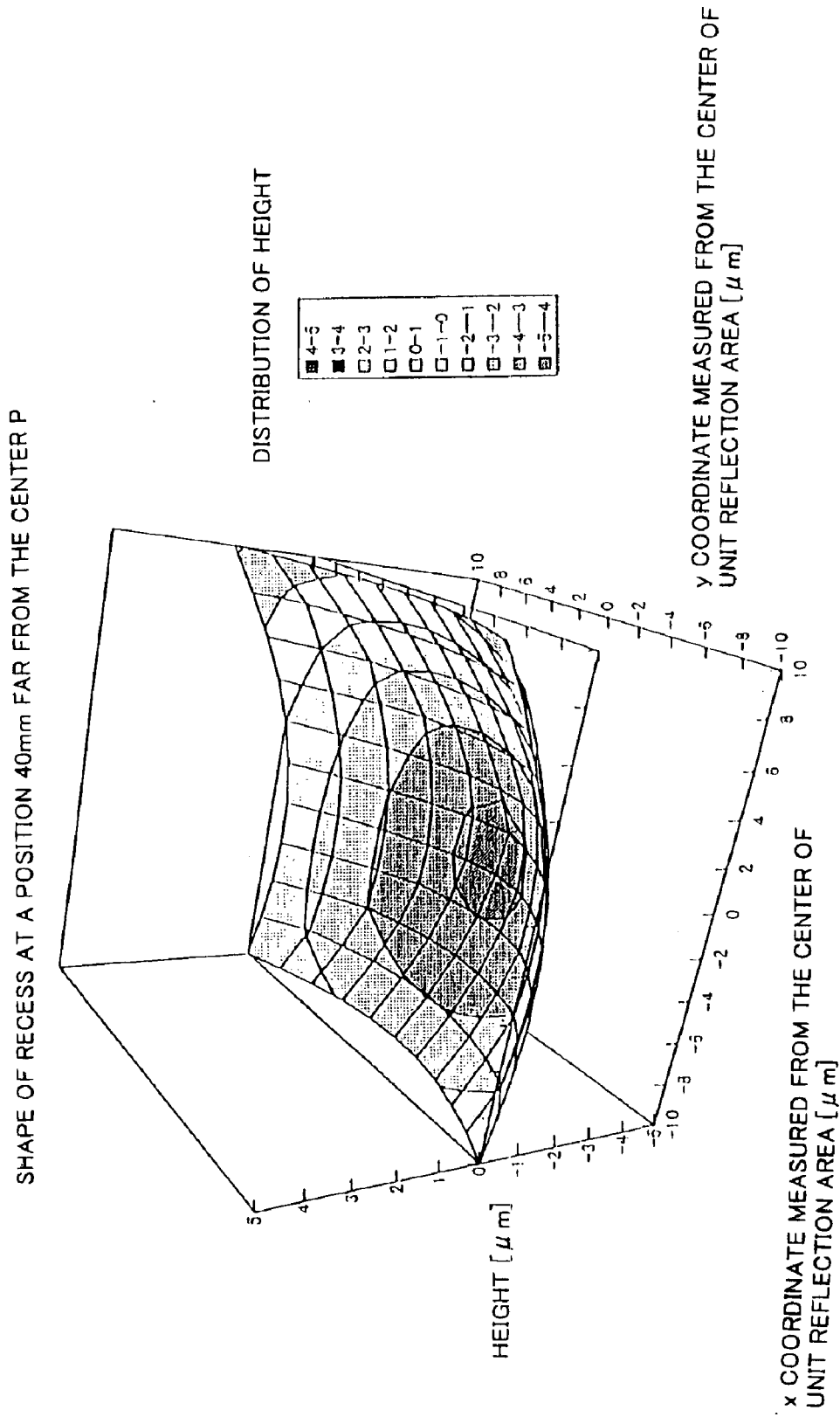
FIG. 42 is a perspective view showing the recess shown in FIG. 41 by discriminating the same with gradations on the basis of heights thereof.
Figure 43:
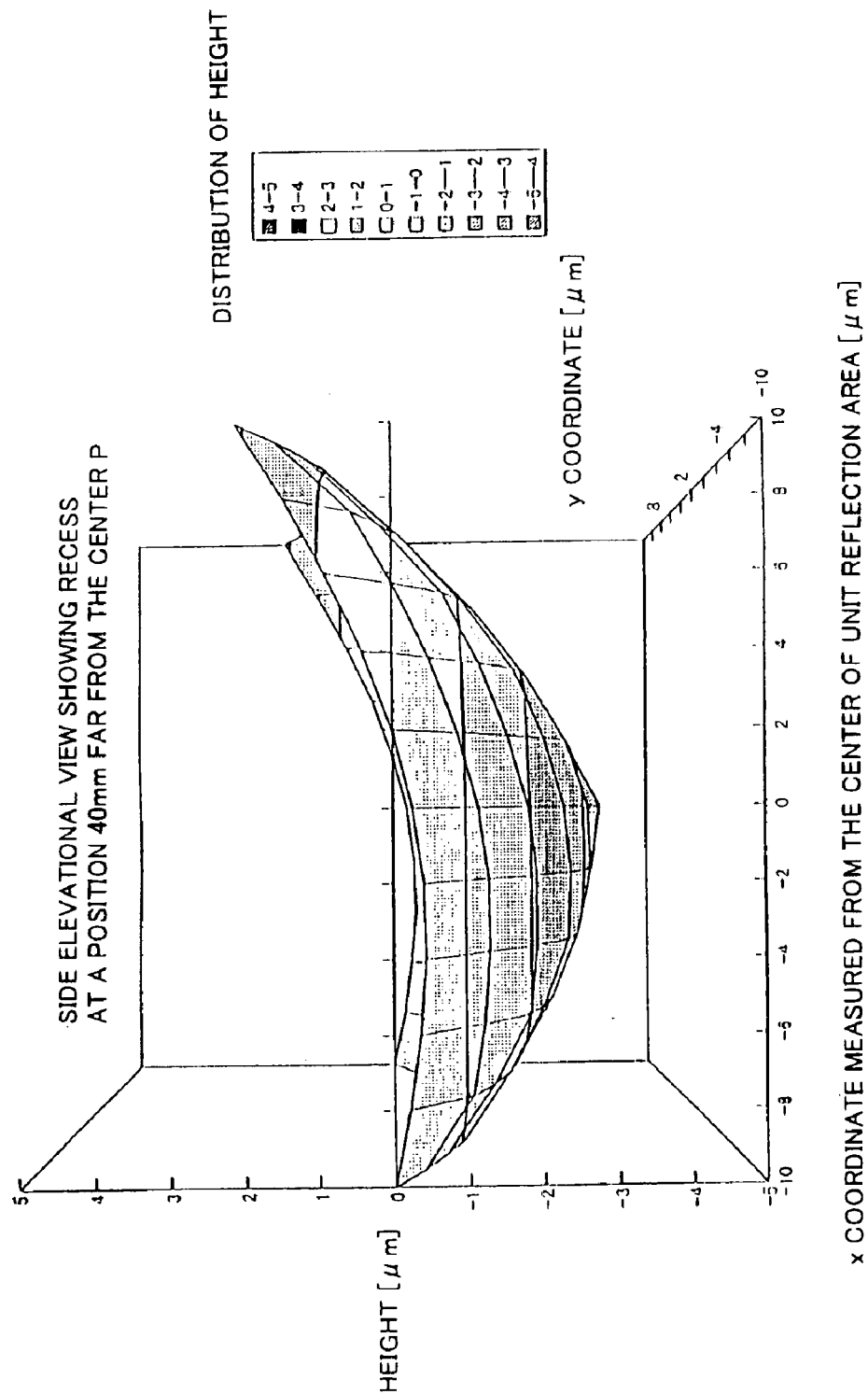
FIG. 43 is a side elevational view showing the recess shown in FIG. 41 by discriminating the same with gradations on the basis of heights thereof.
Figure 45:
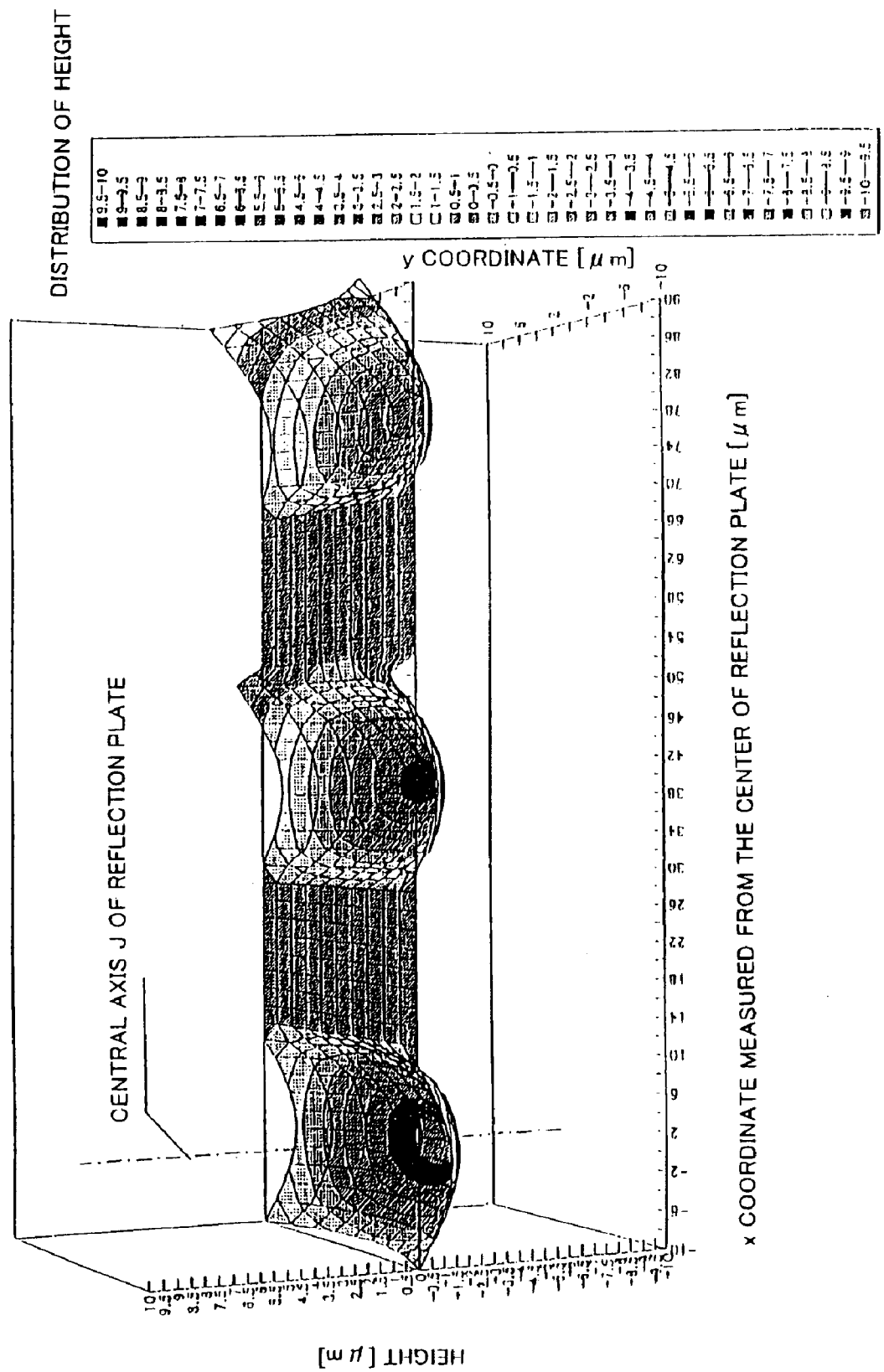
FIG. 45 is a perspective view showing an array of a row of recesses in the vicinity of the center of the reflection plate by discriminating the same with gradations on the basis of heights.

FIG. 38 through FIG. 45 show a design example of a reflection plate that is designed by the method of forming a recess pattern of the reflection plate 11 by varying inclinations of the recesses 17*b* as described above. FIG. 38 is a view showing a cross-sectional view of a recess 17*b* 20 μm wide, which is provided at the center of the reflection plate 11, FIG. 39 is a view (wire-frame view) in which the recess 17*b* is observed diagonally, and FIG. 40 is a view (wire-frame view) in which the recess 17*b* is observed from a side. FIG. 41 is a view showing a cross-sectional view of a recess 17*b* 20 μm wide, which is located at a position 40 far from the center of the reflection plate 11, FIG. 42 is a view (wire-frame view) in which the recess 17*b* is observed diagonally, and FIG. 43 is a view (wire-frame view) in which the recess 17*b* is observed from a side. Also, the plane whose height is 0 is the same plane as the surface of the reflection plate 11. In addition, FIG. 44 is a view showing arrays of recesses 17*b* in the vicinity of the center of the reflection plate 11. Further, FIG. 45 is a view showing a single row of recesses 17*b* in the vicinity of the center of the reflection plate 11 (in which, although illustration of flat portions is omitted, recesses are actually provided on these flat portions).

Figure 46:
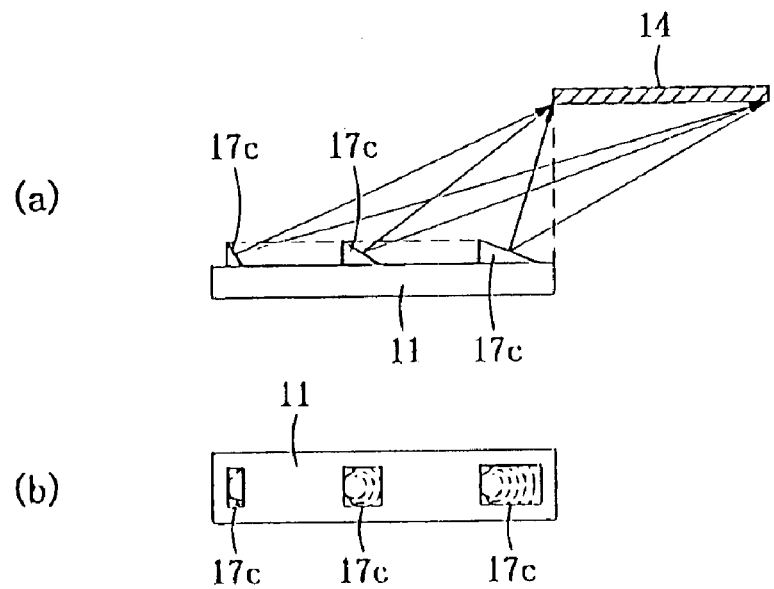
FIGS. 46(a) and (b) are, respectively, a front elevational view and a plan view each showing a reflection plate according to still another embodiment of the invention.
Figure 47:
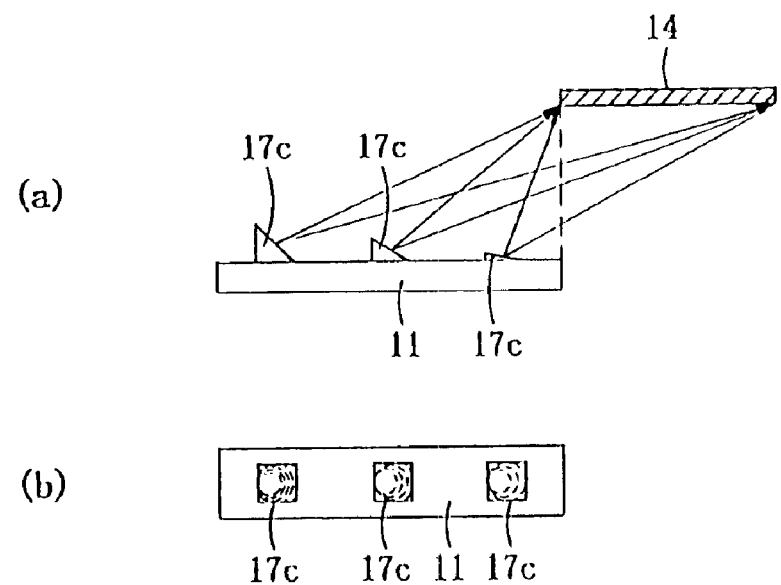
FIGS. 47(a) and (b) are, respectively, a front elevational view and a plan view each showing a reflection plate according to still another embodiment of the invention.

FIG. 46 and FIG. 47 show minute wedge-like projections 17*c* (recess may be acceptable), which are provided on unit reflection areas 13. Where the emission area 14 from the reflection plate 11 is in only one direction (for example, at the operation side) as shown in FIG. 23(*c*), it is possible to use such a wedge-like projection 17*c*. The projection 17*c* presents a roughly right-angled triangular cross-section, and the surface thereof is curved.

In order to collect light at a specified emission area 14, it is necessary for even a wedge-like projection 17*c* to vary the inclination of the surface in compliance with positions of the projections 17*c*. However, for this reason, as shown in FIGS. 46(*a*) and (*b*), the length (pitch of the projection 17*c*) thereof may be varied while keeping the height of the projections 17*c* constant. Also, as shown in FIGS. 47(*a*) and (*b*), the height thereof may be varied while keeping the length of the projections 17*c* constant.

In addition, although not being illustrated, it is not necessary for the center of the emission area 14 to be located on the perpendicular line passing through the center P of the reflection 11, wherein the emission area 14 may be located at a position shifted from the reflection plate 11. Further, it is not necessary for the emission area 14 to be located in a plane parallel to the reflection plate 11, and it may be inclined with respect to the surface of the reflection plate 11.

Figure 48:
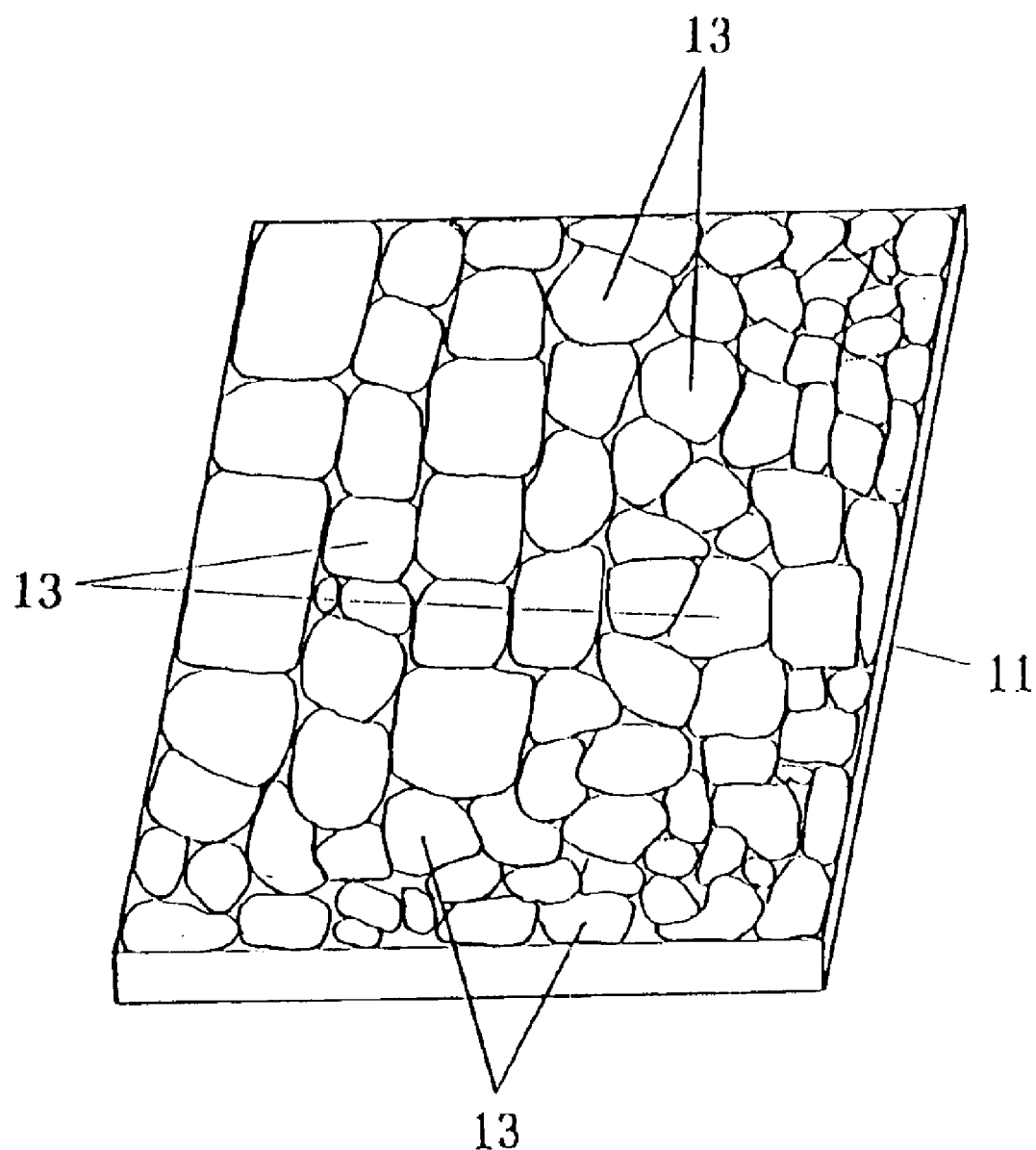
FIG. 48 is a perspective view showing a reflection plate in which unit reflection areas are disposed at random.

In addition, it is not necessary for the unit reflection areas 13 to have uniform dimensions. As shown in FIG. 48, the sizes thereof may be random, and the shape thereof may be polygonal or may be in indeterminate forms. Therefore, it is not necessary that the arrays of the unit reflection areas 13 are in the form of a matrix, wherein the unit reflection areas 13 may be acceptable, which are reflection surfaces in which unit reflection areas are densely two-dimensionally arrayed and have almost no flat portion.

In any one of the respective embodiments, light is devised to be reflected toward the emission area 14 as the entirety of the reflection plate 11. However, it is acceptable that light is reflected into the emission area 14 at only parts of the reflection plane, and light is reflected outside the reflection area 14 at parts of the reflection plane. In this case, it is preferable that light that is emitted to the emission area 14 or the effective field of area 16 is 70% of more of the entire incident light.

The above-described reflection plate 11 may be produced by the 2P (Photo-Polymarization) method. In the 2P method, first, a metal die of a reflection plate 11, which is called a "stamper" is produced. Using the stamper, a number of reflection plates are produced by duplication. A description is given of the process with reference to FIG. 49 and FIG. 50. In the production process of the stamper 45, a substrate 41 is prepared as shown in FIG. 49(*a*), and electronic beam resist 42 is coated thereon. Next, as shown in FIG. 49*b*), the electronic beam resist 42 that is patterned by exposure to electronic beams is softened to produce shapes of recesses and projections 43 of the emission area 14 of the reflection plate 11. Then, an original board 44 is produced. Next, a stamper material such as metal, which is, for example, nickel, resin, etc., is deposited on the original board 44 by an electroforming method, thereby producing a stamper 45 as shown in FIG. 49(c). As shown in FIG. 49(d), the stamper 45 is peeled off from the original board 44 and separated therefrom, an inverted pattern 46 in which the recesses and projections 43 of a reflection plate 11 are inverted are formed on the underside of the stamper 45. This becomes a die for molding the reflection plate 11.

Thereafter, as shown in FIG. 50(a), after an ultraviolet ray hardening resin 48 is dropped on a transparent substrate 47 such as a glass substrate, a transparent resin film, etc., (however, where the stamper 45 allows ultraviolet rays to penetrate therethrough, it is not necessary that the substrate 47 is transparent), the stamper 45 is made to fall down from above the ultraviolet ray hardening resin 48 onto the substrate 47, wherein the ultraviolet ray hardening resin 48 is pressed to be widened between the substrate 47 and the stamper 45, whereby the ultraviolet ray hardening resin 48 is filled between the substrate 47 and the stamper 45.

Continuously, as shown in FIG. 50(b), where an ultraviolet ray is irradiated onto the ultraviolet ray hardening resin 48 from the substrate side (or from the stamper side where the stamper 45 causes ultraviolet rays to penetrate), the ultraviolet ray hardening resin 48 is hardened by an optical hardening reaction. After the ultraviolet ray hardening resin 48 is hardened, the stamper 45 is peeled off from the ultraviolet ray hardening resin 48, wherein, as shown in FIG. 50(c), an inverted pattern 46 of the stamper 45 is transferred onto the surface of the ultraviolet ray hardening resin 48. Thus, a pattern 49 of recesses and projections of unit reflection areas 13 is formed. After that, a metal thin membrane such as Ag, Al, etc., is deposited on the ultraviolet ray hardening resin 48 by spattering, and as shown in FIG. 50(d), a reflection film 50 is formed by the metal thin membrane, wherein a reflection plate 11 is completed.

FIGS. 51(a), (b), (c) and (d) are cross-sectional views showing another method for producing a reflection plate using the above-described stamper 45. With this method, as shown in FIG. 51(a), after resin 48A is coated on a transparent substrate 47 such as a glass substrate and transparent resin film, etc., by a spin coat method and is hardened by baking, the stamper 45 is made to fall down from above the resin 48A onto the substrate 47, and as shown in FIG. 51(b), stress is applied to the resin 48A from above the stamper 45 to collapse the resin 48A. Subsequently, as the stamper 45 is peeled off from the resin 48A, the inverted pattern 46 of the stamper 45 is transferred onto the surface of the resin 48A as shown in FIG. 51(c), wherein a pattern 49 of recesses and projections of unit reflection areas 13 is formed. Thereafter, a metal thin membrane such as Ag, Al, etc., is deposited on the resin 48A by spattering, etc., and a reflection film 50 is formed by the metal thin membrane as shown in FIG. 51(d), whereby a reflection plate 11 is completed.

Figure 50:
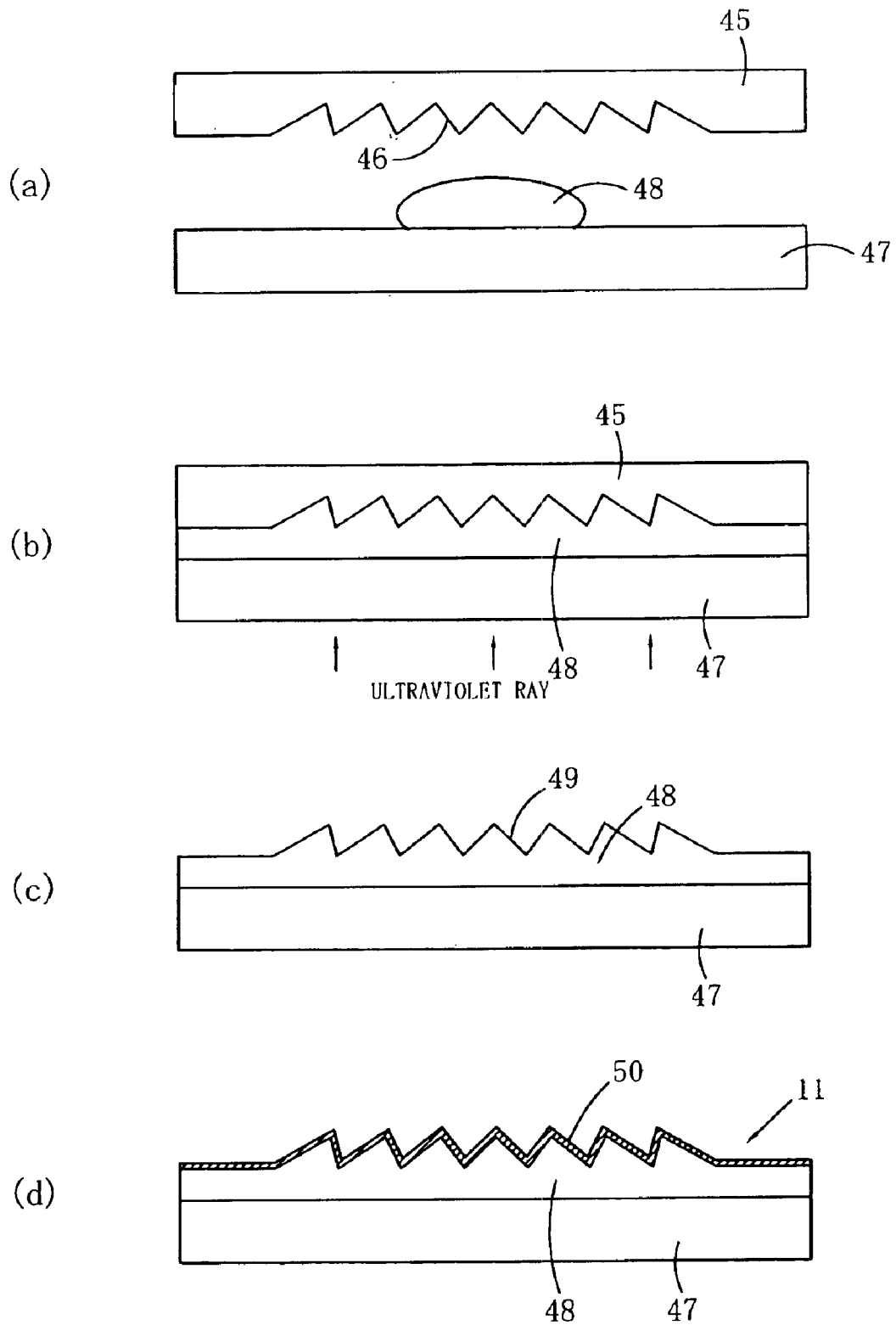
FIGS. 50(a), (b), (c) and (d) are general cross-sectional views showing a method for producing a reflection plate using the same stamper.

The method for producing a reflection plate 11 by a stamper 45, which is shown in FIG. 49 and FIG. 50, can be embodied for not only a reflection plate having unit reflection areas 13 consisting of illustrated projections 17a, but also a reflection plate having unit reflection areas 13 consisting of recesses 17b as shown in FIG. 52. Also, a reflection plate shown in FIG. 52 is a reflection plate 11 having unit reflection areas consisting of recesses 17b, in which a reflection film 50 composed of a metal thin membrane is formed on the surface thereof.

The reflection plate shown in FIG. 53 is a reflection plate 11 having a structure different from the above. In the reflection plate 11, after a pattern of unit reflection areas 13 consisting of recesses 17b or projections 17a is formed by a resin 48 on the substrate 47, and a reflection film 50 composed of a metal thin membrane is formed on the surface of the resin 48, a transparent resin layer is further laminated on the reflection film 50, and an optical path convert layer 51 shaped to be like a Fresnel lens is formed by the resin layer 50.

In this connection, in the reflection plate 11, incident light is made incident into the optical path converting layer 51 while being refracted at the boundary of the optical path converting layer 51, and is reflected by the recesses 17b or projections 17a at the rear side of the optical path converting layer 51, and is again refracted at the surface of the optical path converting layer b51. Then, the light is emitted to the emission area 14 (for example, the emission area 14 established so as to surround the emission area of the front regular reflection light forward of the reflection plate 11). With such a reflection plate 11, since it is possible to design so that the reflection light is made incident into the emission area 14 by the reflection layer 50 and the optical path converting layer 51, the freedom of design can be increased.

The reflection plate 11 shown in FIG. 54 and FIG. 55 is composed of a reflection layer 50 and an optical path converting layer 51 as in the reflection plate 11 shown in FIG. 53. That is, in the reflection plate 11 of FIG. 54, a Fresnel lens-shaped pattern is molded on the surface of resin 48, and a reflection film 50 is formed on the surface thereof to form a Fresnel reflection mirror. In addition, an optical path converting layer 51 is further molded with a transparent resin thereon, whereby recesses 17b or projections 17b are formed on the surface of the optical path converting layer 51.

Also, in the reflection plate 11 of FIG. 55, a reflection film 50 composed of a metal thin membrane is formed on the surface of resin 48, an optical path converting layer 51 is formed of a transparent resin thereon, and recesses 17b or projections 17a are formed on the surface of the optical path converting layer 51. In this case, in line with parting from the center P of the reflection plate 11, inclination of the recesses 17b or projections 17a from the perpendicular direction gradually increases.

Figure 56:
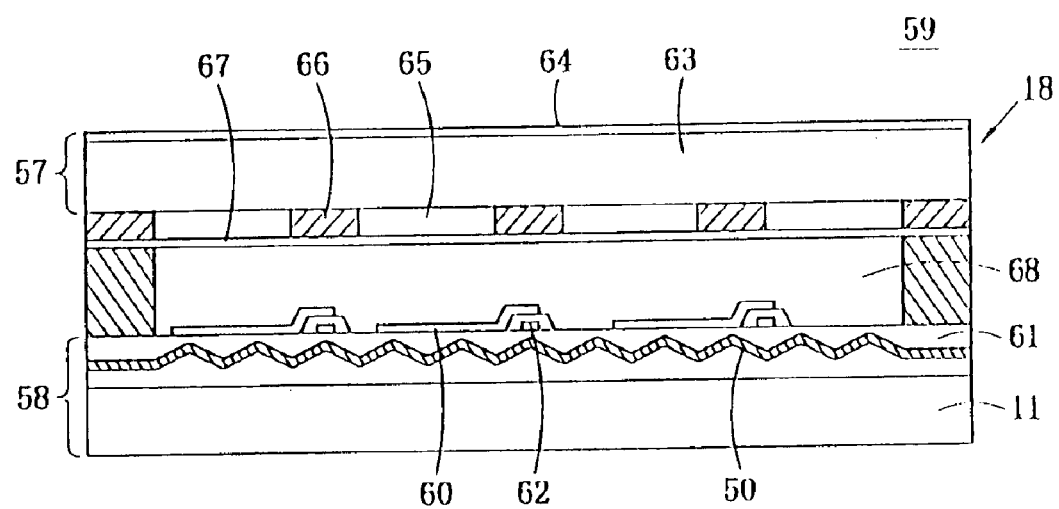
FIG. 56 is a general cross-sectional view showing a reflection type liquid crystal display device.

FIG. 56 is a general view showing a structure of a reflection type liquid crystal display device 59 provided with a reflection plate, which is produced as described with reference to FIG. 50, wherein the liquid crystal panel 18 is constructed so that the reflection plate 11 is composed as a rear side substrate. That is, a flattening membrane 61 is formed on the reflection film 50 by spin-coating a transparent resin such as polyimide resin on the surface of the reflection plate 11 produced as described above. Next, a thin film transistor (TFT) 62 and a transparent electrode (ITO) 60 are provided on the flattening membrane 61 to form a rear side substrate 58.

On the other hand, a black matrix 66, a color film 65, and a transparent electrode (ITO) 67 are formed on the rear side of the glass substrate 63, and a polarization plate 64 is adhered to the surface of the glass substrate 63 to form a surface-side substrate 57. After that, a liquid crystal layer 68 is provided between the rear side substrate 58 and the surface-side substrate 57, wherein a reflection type liquid crystal display device 59 is completed.

According to such a reflection type liquid crystal display device 59, it is possible to produce a reflection type liquid crystal display device having a bright screen, in which an effective field of vision that can allow an operator to observe the entire screen can be widened without being hindered by regular reflection light on the surface of the liquid crystal panel. In addition, according to such a structure, the liquid crystal panel 18 and reflection plate are integrated together, wherein the reflection type liquid crystal display device can be made thin.

Also, a reflection plate according to the invention is not limited to the reflection type liquid crystal display device, and may be applied to other reflection type liquid crystal display devices. Also, although not being illustrated, the reflection plate maybe applicable to a semi-transmission type liquid crystal display device.

A device shown in FIG. 57 is a wireless information transmission device 69 such as a mobile telephone, a weak power radio unit, etc., in which a reflection type liquid crystal display device having a reflection plate according to the invention is used as a display part 70. A device shown in FIG. 58 is an electronic notebook and a mobile information terminal 71 such as a portable computer, in which a reflection type liquid crystal display device having a reflection plate according to the invention is used as a display part 70. Although energy saving is required in such a wireless information transmission device 69 and a mobile information terminal 71, etc., which are driven by a battery, a backlight is no longer required by using such a reflection type liquid crystal display device, wherein energy saving can be achieved. Moreover, wherein a reflection plate according to the invention is used for the reflection type liquid crystal display device, the display screen can be made bright, and recognition characteristics thereof can be improved.

A device shown in FIG. 59 is a television set (television receiver) 72 which is provided with a display part 70 and an antenna 73, and the reflection type liquid crystal display device using a reflection plate according to the invention is used as the display part 70. A device shown in FIG. 60 is a personal computer 74 that is provided with a display 70 and a keyboard 75, wherein a reflection type liquid crystal display device using a reflection plate according to the invention is used as a display part 70. In a screen display device having a function of displaying images, such as a television set 72, and a personal computer 74, energy saving is required. In particular, in portable devices, energy saving is further required because these are driven by batteries. Therefore, if the reflection type liquid crystal display device is used as the display part 70, a backlight is no longer required, wherein energy saving can be achieved. Further, since a reflection plate according to the invention is used for the reflection type liquid crystal display device, the display screen can be made bright, and recognition characteristics thereof can be improved.

INDUSTRIAL APPLICABILITY

The present invention is applied to a reflection type and a semi-transmission type display device (for example, a liquid crystal display device). The applications thereof widely cover apparatuses having a display part such as a liquid crystal display device, a wireless information transmission device, a mobile information terminal, an image display device, etc.

What is claimed is:

1. A reflecting member comprising a plurality of unit reflection areas capable of reflecting incident light substantially entirely into a specified plane area where mostly no regular reflection light is allowed to pass through, wherein said reflecting member is a reflection plate comprising any combination of recesses and projections thereon, wherein at least one of said unit reflection areas is composed of at least one projection, the top of said projection is located on a segment drawn from the center of the at least one unit reflection area to the center of said specified plane area and is biased to the center of said specified plane area.

2. The reflecting member as set forth in claim 1, wherein said unit reflection areas are respectively composed of at least one projection or recess that does not have a plane perpendicular to incident light.

3. The reflecting member as set forth in claim 1, wherein the position of the top of the projection in the at least one unit reflection area changes little by little corresponding to the distance between the at least one unit reflection area and the center of said specified plane area.

4. A stamper for producing the reflecting member described in claim 1, wherein the reflecting member has an inverted shape of the unit reflecting area.

5. A method for producing a reflecting member comprising:
   molding resin into the stamper described in claim 4; and
   after curing the resin as a molded article, peeling off the molded article from the stamper.

6. A liquid crystal display device provided with a reflecting member for displaying by reflecting surrounding light entering from outside, wherein said reflecting member is the reflecting member described in claim 1.

7. The liquid crystal display device as set forth in claim 6, wherein at least one substrate of a plurality of substrates constructed to place a liquid crystal layer therebetween is a reflecting member comprising a plurality of unit reflection areas capable of reflecting incident light substantially entirely into a specified plane area where mostly no regular reflection light is allowed to pass through, wherein said reflecting member is a reflection plate comprising any combination of recesses and projections thereon, wherein at least one of said unit reflection areas is composed of at least one projection, the top of said projection is located on a segment drawn from the center of the at least one unit reflection area to the center of said specified plane area and is biased to the center of said specified plane area.

8. A wireless information transmission device provided with transmitting and receiving features comprising a display part including a liquid crystal display device described in claim 6.

9. A portable information terminal provided with an information processing feature comprising a display part including a liquid crystal display device described in claim 6.

10. An image display device having a feature for displaying images comprising a display part including a liquid crystal display device described in claim 6.

11. A reflecting member comprising a plurality of unit reflection areas capable of reflecting incident light substantially entirely into a specified plane area where mostly no regular reflection light is allowed to pass through, wherein said reflecting member is a reflection plate comprising any combination of recesses and projections thereon, wherein at least one of said unit reflection areas is composed of at least one recess, the lowest point of the recess located on an extension of a segment drawn from the center of said specified plane area to the center of the at least one unit reflection area and is biased opposite to the center of said specified plane area.

12. The reflecting member as set forth in claim 11, wherein the position of the lowest point of a recess in the at least one unit reflection area changes little by little corresponding to the distance between the at least one unit reflection area and the center of said specified plane area.

13. The reflecting member as set forth in claim 11, wherein said unit reflection areas are respectively composed of at least one projection or recess that does not have a plane perpendicular to incident light.

14. A stamper for producing the reflecting member described in claim 11, wherein the reflecting member has an inverted shape of the unit reflecting area.

15. A method for producing a reflecting member comprising:

molding resin into the stamper described in claim 14; and after curing the resin as a molded article, peeling off the molded article from the stamper.

16. A liquid crystal display device provided with a reflecting member for displaying by reflecting surrounding light entering from outside, wherein said reflecting member is the reflecting member described in claim 11.

17. The liquid crystal display device as set forth in claim 16, wherein at least one substrate of a plurality of substrates constructed to place a liquid crystal layer therebetween is a reflecting member comprising a plurality of unit reflection areas capable of reflecting incident light substantially entirely into a specified plane area where mostly no regular reflection light is allowed to pass through, wherein said reflecting member is a reflection plate comprising any combination of recesses and projections thereon, wherein at least one of said unit reflection areas is composed of at least one recess, the lowest point of the recess located on an extension of a segment drawn from the center of said specified plane area to the center of the at least one unit reflection area and is biased opposite to the center of said specified plane area.

18. A wireless information transmission device provided with transmitting and receiving features comprising a display part including a liquid crystal display device as described in claim 16.

19. A portable information terminal provided with an information processing feature comprising a display part including a liquid crystal display device described in claim 16.

20. An image display device having a feature for displaying images comprising a display part including a liquid crystal display device described in claim 16.

* * * * *

UNITED STATES PATENT AND TRADEMARK OFFICE
CERTIFICATE OF CORRECTION

| | | |
|---|---|---|
| PATENT NO. | : 6,894,746 B1 | Page 1 of 1 |
| APPLICATION NO. | : 10/129718 | |
| DATED | : May 17, 2005 | |
| INVENTOR(S) | : Katsuyuki Manabe et al. | |

It is certified that error appears in the above-identified patent and that said Letters Patent is hereby corrected as shown below:

On the Title page under Section 56, References Cited, U.S. Patent Documents, please add the following reference:

--6,476,890 B1 * 11/2002 Funahata et al.........349/113--

Signed and Sealed this

Third Day of April, 2007

JON W. DUDAS
*Director of the United States Patent and Trademark Office*